(12) United States Patent
Sugita

(10) Patent No.: US 7,587,463 B2
(45) Date of Patent: Sep. 8, 2009

(54) APPARATUS AND METHOD OF REWRITING FIRMWARE

(75) Inventor: Takatoshi Sugita, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1548 days.

(21) Appl. No.: 10/464,824

(22) Filed: Jun. 17, 2003

(65) Prior Publication Data

US 2004/0068548 A1    Apr. 8, 2004

(30) Foreign Application Priority Data

| Jun. 17, 2002 | (JP) | ............................. 2002-175389 |
| Jun. 17, 2002 | (JP) | ............................. 2002-175390 |
| Jun. 21, 2002 | (JP) | ............................. 2002-180788 |
| May 23, 2003 | (JP) | ............................. 2003-146102 |
| May 23, 2003 | (JP) | ............................. 2003-146103 |

(51) Int. Cl.
  *G06F 15/16* (2006.01)
  *H04N 1/407* (2006.01)

(52) U.S. Cl. ............................. 709/208; 714/55; 714/49; 714/764; 714/754; 714/703; 714/764; 359/466; 359/456; 359/504; 359/455; 359/521

(58) Field of Classification Search .................. 709/208, 709/209
See application file for complete search history.

(56) References Cited

U.S. PATENT DOCUMENTS

| 5,406,484 | A  | 4/1995 | Wurzenberger |
| 5,787,288 | A  | 7/1998 | Nagata et al. |
| 5,844,843 | A  | 12/1998 | Matsubara et al. |
| 6,134,628 | A  | 10/2000 | Hamadani |
| 6,175,919 | B1 | 1/2001 | Ha |
| 6,256,226 | B1 | 7/2001 | Fujita |
| 6,360,362 | B1 | 3/2002 | Fichtner et al. |
| 6,549,947 | B1 | 4/2003 | Suzuki |
| 6,775,830 | B1 | 8/2004 | Matsunami et al. |
| 6,990,659 | B1 | 1/2006 | Imai |
| 2002/0071322 | A1 | 6/2002 | Hanyu |
| 2002/0085229 | A1 | 7/2002 | Ikegami et al. |
| 2004/0194084 | A1 | 9/2004 | Matsunami et al. |

FOREIGN PATENT DOCUMENTS

| CN | 1297547 A | 5/2001 |
| EP | 0 618 531 A1 | 8/1993 |
| EP | 0 654 936 A2 | 5/1995 |
| EP | 0 654 936 B1 | 10/1998 |
| EP | 1 024 424 A2 | 8/2000 |
| GB | 2 349 967 A | 11/2000 |
| JP | 6-301547 A | 10/1994 |
| JP | 7-143271 A | 6/1995 |
| JP | 8-161231 A | 6/1996 |
| JP | 08-166883 A | 6/1996 |

(Continued)

*Primary Examiner*—Jude J Jean Gilles
(74) *Attorney, Agent, or Firm*—Sughrue Mion, PLLC

(57) ABSTRACT

A main controller sends a "rewrite mode" command to an engine controller. Receiving the command, the engine controller 12 sends a "roger" status. This switches the mode from a print mode to a rewrite mode. In the rewrite mode, the engine controller 12 serves as a master and the main controller 11 serves as a slave, a communication which is necessary for rewriting of firmware takes place between the two, and the firmware is rewritten.

8 Claims, 12 Drawing Sheets

FOREIGN PATENT DOCUMENTS

| | | |
|---|---|---|
| JP | 9-251355 A | 9/1997 |
| JP | 10-260841 A | 9/1998 |
| JP | 10-301724 A | 11/1998 |
| JP | 11-194946 A | 7/1999 |
| JP | 11-265346 A | 9/1999 |
| JP | 11-268385 A | 10/1999 |
| JP | 11-282656 A | 10/1999 |
| JP | 11-282690 A | 10/1999 |
| JP | 2000-172453 A | 6/2000 |
| JP | 2000-194544 A | 7/2000 |
| JP | 2000-207153 A | 7/2000 |
| JP | 2000-316066 A | 11/2000 |
| JP | 2000-324195 A | 11/2000 |
| JP | 2001-117779 A | 4/2001 |
| JP | 2001-159979 A | 6/2001 |
| JP | 2001-202208 A | 7/2001 |
| JP | 3187624 B2 | 7/2001 |
| JP | 2002-007152 A | 1/2002 |
| JP | 2002-023965 A | 1/2002 |
| JP | 2002-504724 A | 2/2002 |
| JP | 2002-101166 A | 4/2002 |
| WO | WO 99/42924 A1 | 8/1999 |

APPARATUS AND METHOD OF REWRITING FIRMWARE

BACKGROUND OF THE INVENTION

1. Field of the Invention

The present invention relates to a technique for rewriting firmware which is stored in a memory. To be more specific, the present invention is applicable to an image forming apparatus in which a main controller is connected for mutual communications with an engine controller which comprises a rewritable memory which stores firmware. The present invention is applicable also to an information processing system in which a host apparatus is connected for mutual communications with an image forming apparatus which comprises a rewritable memory which stores firmware. Further, the present invention is applicable to a rewriting method, a rewriting program and a recording medium for rewriting firmware which is stored in a memory of an engine controller or the like which is disposed in an image forming apparatus.

2. Description of the Related Art

Known as an image forming apparatus such as a printer, a copier machine and a facsimile machine is an apparatus in which two controllers are connected for mutual communications with each other via a communications interface as described in Japanese Patent Application Laid-Open Gazette No. H8-161231. In this image forming apparatus, when provided with an image signal from an external apparatus such as a host computer, a built-in scanner or the like, a main controller analyzes the image signal, performs various types of image processing, and then supplies the resulting image-processed signal (which may be an image signal for instance) to an engine controller. The engine controller comprises a CPU which serves as a central processor and a rewritable non-volatile memory which stores firmware. Receiving the signal mentioned above, based on the firmware which is stored in the non-volatile memory such as a flash ROM and an EEPROM, the engine controller controls an engine of the apparatus. Hence, an image corresponding to the image signal is formed on a sheet such as a copy paper, a transfer paper, other general paper, a transparent sheet for an overhead projector, etc.

The reason the firmware is stored in the rewritable non-volatile memory in the example described above is to flexibly deal with addition of a function, upgrading or the like in the future. In other words, when it becomes necessary to add a function or implement upgrading, firmware containing addition of a function or the like is newly generated, and the new firmware is written over and replaces the old firmware.

By the way, in the conventional apparatus described above, for the purpose of allowing two controllers to communicate with each other, the conventional apparatus has the main controller function as a master and the engine controller function as a slave. That is, the engine controller operates in response to a command, data or the like from the main controller. When provided with an image-processed signal from the main controller, the engine controller executes a print mode which is for forming an image corresponding to this signal based on the firmware. Meanwhile, when it becomes necessary to rewrite the firmware, the engine controller enters a rewrite mode which is for rewriting the firmware in accordance with a command from the main controller. In the rewrite mode, the engine controller accesses the non-volatile memory and controls rewriting of the firmware.

However, as described above, since the engine controller is instructed or controlled by the main controller, the engine controller must execute rewriting of the firmware while always responding to a command or the like received from the main controller. Because of this, the rewriting of the firmware is not always efficient.

Further, such a problem does not occur only with the conventional apparatus described above but commonly arises also in the following information processing system. Known as this type of information processing system is a system in which a host apparatus such as a host computer is connected for mutual communications with a printer which serves as an image forming apparatus as described in Japanese Patent Application Laid-Open Gazette No. 2000-172453. The image forming apparatus described in this gazette comprises only a minimum mechanism needed as a printer, i.e., typically a function for receiving bitmapped image data from the host apparatus and simply printing the data. The image forming apparatus is therefore generally referred to as a dumb printer or a host-based printer. In short, this image forming apparatus comprises a CPU which serves as a central processor and a rewritable non-volatile memory which stores firmware. The image forming apparatus, when receiving a signal which is indicative of the image data mentioned above, controls an engine based on firmware which is stored in the non-volatile memory such as a flash ROM and an EEPROM. Hence, an image corresponding to the image data is formed on a sheet such as a copy paper, a transfer paper, other general paper, a transparent sheet for an overhead projector, etc.

In the information processing system described above, therefore, the host apparatus functions as a master while the image forming apparatus functions as a slave so that the host apparatus and the image forming apparatus can communicate with each other. In other words, the image forming apparatus operates in response to a command, data or the like from the host apparatus. When provided with a signal which is indicative of image data from the host apparatus, the image forming apparatus executes a print mode which is for forming an image which corresponds to this signal based on the firmware. Meanwhile, when it becomes necessary to rewrite the firmware, the image forming apparatus enters a rewrite mode which is for rewriting the firmware in accordance with a command from the host apparatus. In the rewrite mode, the image forming apparatus accesses the non-volatile memory and controls rewriting of the firmware.

However, since the image forming apparatus is instructed or controlled by the host apparatus as described above, the image forming apparatus must execute rewriting of the firmware while always responding to a command or the like received from the host apparatus. Because of this, the rewriting of the firmware is not always efficient.

By the way, in the conventional apparatus described above, for the purpose of allowing the two controllers to communicate with each other, the conventional apparatus has the main controller function as a master and the engine controller function as a slave. The engine controller is instructed or controlled by the main controller. That is, a plurality types of commands are prepared in the main controller in advance, and the main controller sends the engine controller a command, data or the like which corresponds to the operating state of the apparatus. The engine controller then executes processing which corresponds to the received command or the like, e.g., a printing operation for forming an image which corresponds to an image signal based on firmware (print mode) or a rewriting operation for rewriting the firmware (rewrite mode).

As described above, in the case of the conventional apparatus, it is necessary that the engine controller judges the content of a command, controls respective portions of the apparatus in accordance with the judgment and returns statuses or the like which are indicative of the conditions of the respective portions of the apparatus. Over the recent years in particular, as functions of the apparatus have become highly advanced and complex, there are now more types of commands which are transmitted from the main controller and the contents of statuses to be returned back to the main controller are more complex. Hence, even when one wishes to execute a rewrite mode in which merely limited processing of rewriting firmware is performed, it is necessary that the engine controller is structured so as to respond to all commands which are sent from the main controller. In other words, whatever command is transmitted from the main controller, the engine controller needs judge the content of the command and return a status corresponding to the command even if the command is irrelevant to the rewrite mode. Thus, rewriting of firmware is not always efficient in a conventional image forming apparatus.

Such a problem does not occur only with an image forming apparatus in which two controllers are connected for mutual communications with each other via a communications interface. As described in Japanese Patent Application Laid-Open Gazette No. 2000-172453, this problem arises also in an information processing system in which a host apparatus such as a host computer is connected for mutual communications with a printer which serves as an image forming apparatus.

Further, a rewrite error could occur in firmware during rewriting of the firmware in a manner as that described above. For example, in a conventional apparatus, new firmware is rewritten in a non-volatile memory disposed within an engine controller via a communications interface. In such an apparatus, it is possible that transmission of normal data to the engine controller will fail because of a communications error. A write error could further occur during writing of data in the non-volatile memory. If the print mode is continuously executed despite such a rewrite error, a malfunction or incapability of printing will occur. To avoid a firmware-induced operation failure, an appropriate countermeasure is therefore needed.

SUMMARY OF THE INVENTION

A major object of the present invention is to efficiently rewrite firmware within an image forming apparatus in which a main controller is connected for mutual communications with an engine controller which comprises a rewritable memory which stores the firmware and the engine controller forms, in accordance with a signal fed from the main controller, an image which corresponds to this signal.

Another object of the present invention is to efficiently rewrite firmware within an information processing system in which a host apparatus is connected for mutual communications with an image forming apparatus which comprises a rewritable memory which stores the firmware and the image forming apparatus formes, in accordance with a signal fed from the host apparatus, an image which corresponds to this signal.

Further another object of the present invention is to prevent an operation failure attributed to firmware without fail within an image forming apparatus which is capable of rewriting firmware.

The present invention is directed to a technique for rewriting firmware which is stored in a memory. According to the first aspect of the present invention, in fulfillment of the foregoing object, there are provided an image forming apparatus, a firmware rewriting method, a firmware rewriting program for the apparatus and recording medium storing the program. The apparatus comprises: a main controller; and an engine controller, including a writable first memory which stores firmware, for controlling so that an image which corresponds to a signal fed from the main controller is formed in accordance with the signal, the main controller and the engine controller being connected for mutual communications with each other, wherein it is possible to switch between a print mode and a rewrite mode, the print mode being for forming an image corresponding to the signal based on the firmware stored in the first memory, the rewrite mode being for rewriting the firmware; and a master/slave relationship between the main controller and the engine controller is reversed in accordance with switching between the modes.

According to the second aspect of the present invention, in fulfillment of the foregoing object, there are provided an image forming apparatus, a firmware rewriting method, a firmware rewriting program for the apparatus and recording medium storing the program. The apparatus comprises: a main controller; and an engine controller which includes a writable first memory which stores firmware, wherein the main controller and the engine controller are connected for mutual communications with each other and the apparatus as a whole is controlled as a plurality types of commands are sent from the main controller to the engine controller; and when a rewrite mode for rewriting firmware is selected, the number of the types of usable commands is reduced.

According to the third aspect of the present invention, in fulfillment of the foregoing object, there are provided an information processing system, a firmware rewriting method, a firmware rewriting program for the system and recording medium storing the program. The system comprises: a host apparatus; and an image forming apparatus, including a writable memory which stores firmware, for forming an image which corresponds to a signal fed from the host apparatus is formed in accordance with the signal, the host apparatus and the image forming apparatus being connected for mutual communications with each other, wherein it is possible to switch between a print mode and a rewrite mode, the print mode being for forming an image corresponding to the signal based on the firmware stored in the memory, the rewrite mode being for rewriting the firmware; and a master/slave relationship between the host apparatus and the image forming apparatus is reversed in accordance with switching between the modes.

According to the fourth aspect of the present invention, in fulfillment of the foregoing object, there are provided an information processing system, a firmware rewriting method, a firmware rewriting program for the system and recording medium storing the program. The system comprises: a host apparatus; and an image forming apparatus including a writable memory which stores firmware, wherein the host apparatus and the image forming apparatus are connected for mutual communications with each other and the image forming apparatus is controlled as a plurality types of commands are sent from the host apparatus to the image forming apparatus; and when a rewrite mode for rewriting firmware is selected, the number of the types of usable commands is reduced.

According to the fifth aspect of the present invention, in fulfillment of the foregoing object, there are provided an image forming apparatus, a firmware rewriting method, a firmware rewriting program for the apparatus and recording medium storing the program. The apparatus comprises: a writable first memory which stores firmware; and a controller which executes a print mode or a rewrite mode selectively, the print mode being for forming an image corresponding to the signal based on the firmware stored in the first memory, the rewrite mode being for rewriting the firmware; wherein the controller detects whether a rewrite error has occurred during execution of the rewrite mode.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE EMBODIMENTS

A. First Embodiment

Figure 1:
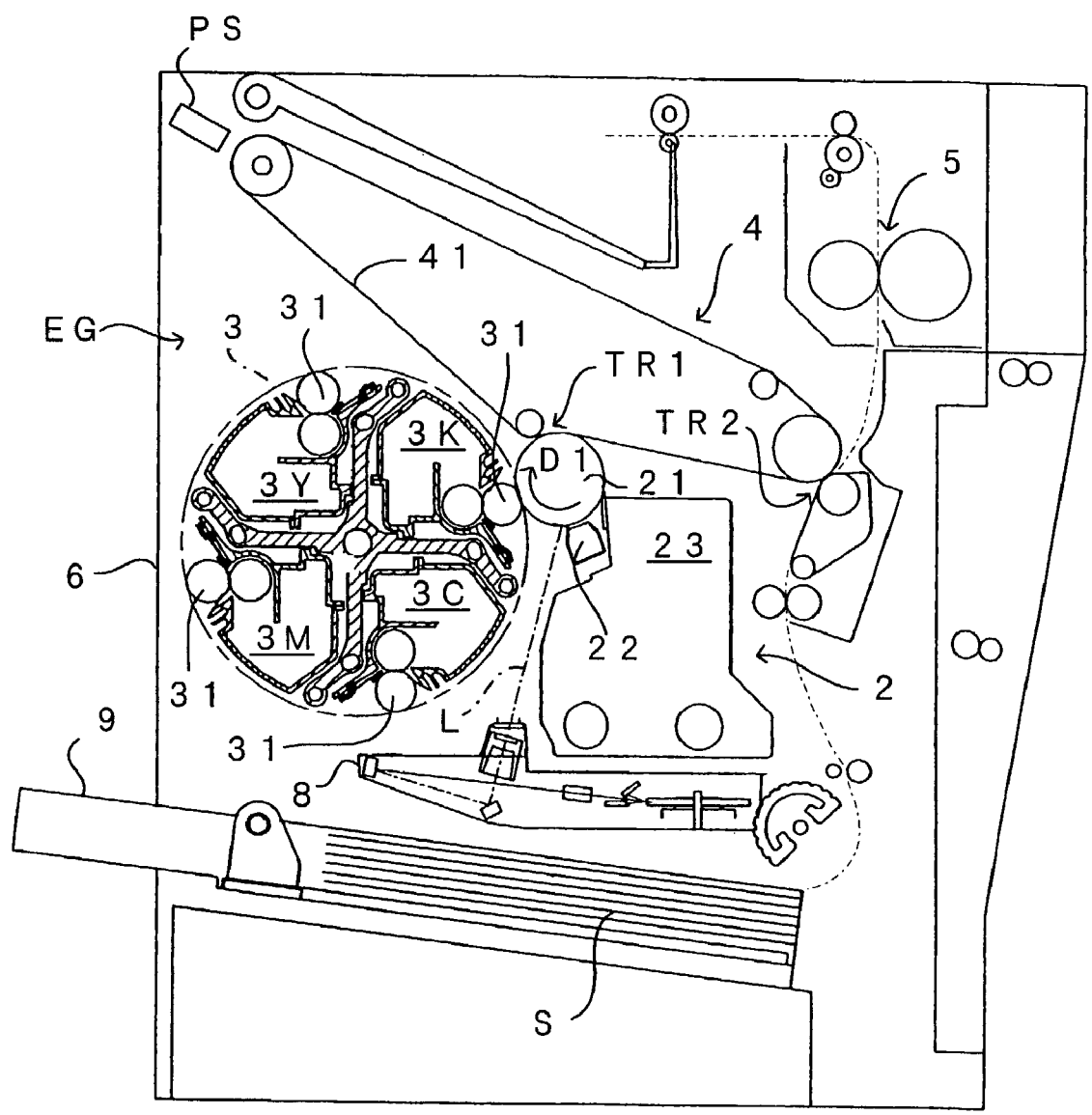
FIG. 1 is a drawing which shows a first embodiment of the present invention.
Figure 2:
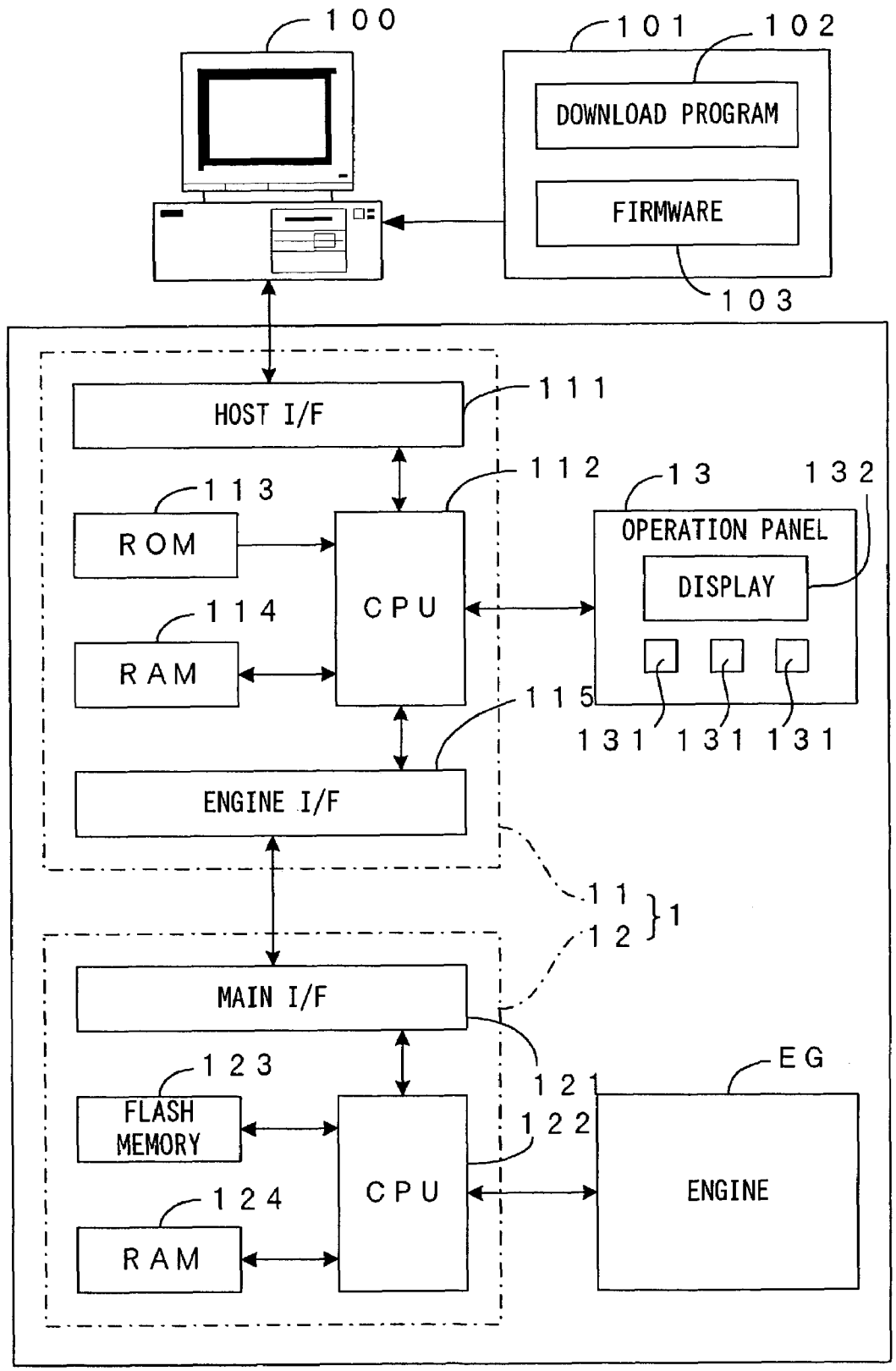
FIG. 2 is a block diagram which shows an electric structure of an image forming apparatus which is shown in FIG. 1.

FIG. 1 is a drawing which shows a first embodiment of the present invention. FIG. 2 is a block diagram which shows an electric structure of an image forming apparatus which is shown in FIG. 1. This image forming apparatus is an apparatus which superposes toner in four colors of yellow (Y), magenta (M), cyan (C) and black (K) and accordingly formes a full-color image, or uses only toner in black (K) and accordingly formes a monochrome image. In this image forming apparatus, an image signal is fed to a main controller 11 of a control unit 1 from an external apparatus such as a host computer 100. The main controller 11 analyzes this image signal, performs various types of image processing, and then supplies the resulting image-processed signal to an engine controller 12. The engine controller 12 controls respective portions of an engine EG of the image forming apparatus based on firmware stored in a flash memory 123. The engine EG forms an image corresponding to the image signal on a sheet S such as a copy paper, a transfer paper, other general paper, a transparent sheet for an overhead projector, etc.

In the engine EG, seven units are freely attachable to and detachable from an apparatus body 6, namely, (a) a photosensitive unit 2, (b) a yellow developing unit (hereinafter referred to as "Y developing unit") 3Y, (c) a magenta developing unit (hereinafter referred to as "M developing unit") 3M, (d) a cyan developing unit (hereinafter referred to as "C developing unit") 3C, (e) a black developing unit (hereinafter referred to as "K developing unit") 3K, (f) an intermediate transfer unit 4 and (g) a fixing unit 5. With all the units 2, 3Y, 3M, 3C, 3K, 4 and 5 mounted to the apparatus body 6, as shown in FIG. 1, a photosensitive member 21 of the photosensitive unit 2 rotates in the arrow direction D1 in FIG. 1. Around the photosensitive member 21, an charger 22, a rotary developing device 3 which is formed by the developing units 3Y, 3M, 3C and 3K, and a cleaner 23 are disposed along the rotation direction D1 of the photosensitive member 21.

Of the seven units 2, 3Y, 3M, 3C, 3K, 4 and 5, the photosensitive unit 2 houses the photosensitive member 21, the charger 22 and the cleaner 23. These are freely attachable to and detachable as one unit from the apparatus body 6. A charging bias generator not shown applies a charging bias upon the charger 22, and the charger 22 uniformly charges an outer circumferential surface of the photosensitive member 21. In the photosensitive unit 2, the cleaner 23 is disposed on the upstream side to the charger 22 along the rotation direction D1 of the photosensitive member 21, so as to scrape off toner which remains adhering to the outer circumferential surface of the photosensitive member 21 after primary transfer. A surface of the photosensitive member 21 is cleaned in this manner.

An exposure unit 8 emits a light beam L toward the outer circumferential surface of the photosensitive member 21 which is thus charged by the charger 22. The exposure unit 8 is electrically connected with a laser driver (not shown) which is disposed to the engine controller 12. The exposure unit 8 is controlled in accordance with a drive signal supplied from the laser driver, the light beam L exposes on the photosensitive member 21, and an electrostatic latent image corresponding to an image signal is accordingly formed on the photosensitive member 21.

The rotary developing device 3 develops thus formed electrostatic latent image with toner. In the rotary developing device 3, the black developing unit 3K, the cyan developing unit 3C, the magenta developing unit 3M and the yellow developing unit 3Y are disposed for free rotations about an axis. These developing units 3Y, 3M, 3C and 3K move to a plurality of predetermined positions and are positioned there, while selectively positioned at a developing position to the photosensitive member 21. The black developing unit 3K is positioned at the developing position in FIG. 1, and with the black developing unit 3K positioned in this condition, a developing roller 31 disposed to the black developing unit 3K is faced to the photosensitive member 21. As for the other developing units 3Y, 3M and 3C as well, in exactly the same manner as that in the black developing unit 3K, the respective developing units are positioned at the developing position. Hence, the developing rollers 31 disposed to the respective developing units are accordingly positioned facing the photosensitive member 21.

In the developing unit positioned at the developing position, toner held within a unit housing is transported to the developing position while carried by the developing roller 31. As a predetermined developing bias is applied upon the developing roller 31, the toner inside the unit housing thus selectively positioned at the developing position adheres to the photosensitive member 21 from the developing roller 31, whereby an electrostatic latent image is visualized. In this manner, a toner image in the selected color is formed on the surface of the photosensitive member 21.

Within a primary transfer region TR1, the toner image developed by the developing device 3 as described above is primarily transferred onto an intermediate transfer belt 41 of the intermediate transfer unit 4. In short, the intermediate transfer unit 4 comprises the intermediate transfer belt 41 which runs across a plurality of rollers and a driver (not shown) which drives the intermediate transfer belt 41 into rotations. For transfer of a color image onto the sheet S, toner images in the respective colors on the photosensitive member 21 are superposed one atop the other on the intermediate transfer belt 41, thereby forming a color image. On the other hand, for transfer of a monochrome image onto the sheet S, a toner image in the black color on the photosensitive member 21 alone is transferred onto the intermediate transfer belt 41, and a monochrome image is formed.

In the image forming apparatus according to this embodiment, for the purpose of detecting the density of a patch image, there is a patch sensor PS facing one of the rollers across which the intermediate transfer belt 41 runs.

An image formed on the intermediate transfer belt 41 is secondarily transferred onto the sheet S which was unloaded from a cassette 9, within a secondary transfer region TR2. The sheet S now seating thus transferred toner image is loaded in the fixing unit 5 in which a heater (not shown) is disposed, and with a pressure applied under heat, the toner is fixed on the sheet S. The sheet S now seating thus formed image is transported to a discharge tray which is located to a top surface part of the apparatus body 6.

The electric structure of the image forming apparatus shown in FIG. 1 will now be described with reference to FIG. 2. The main controller 11 comprises a host interface 111, a CPU 112, a ROM 113, a RAM 114 and an engine interface 115. The main controller 11 is structured so that the host interface 111 can communicate with the host computer 100. The main controller 11 receives an image signal, a downloaded program described later, a firmware file and the like sent from the host computer 100. An image signal or the like thus received is primarily stored in the RAM 114.

The CPU 112 is electrically connected with an operation panel 13 which is attached to the apparatus body 6 through an input/output port not shown. In the operation panel 13, there are a plurality of switches 131 for a user to provide various types of instructions to the CPU 112. In addition, the operation panel 13 also comprises a display 132 which shows a user a message, a printing state, etc. In this embodiment, the operation panel 13 functions as a man-machine interface.

The ROM 113 stores a program for the main controller 11 in advance. As the CPU 112 and a logic circuit (not shown) operate in accordance with the program, the received image signal is processed through various types of image processing. That is, the main controller 11 receiving the image signal from the host computer 100 converts RGB data, which express gradation levels of RGB components of the respective pixels within the image corresponding to this image signal, into CMYK data which express gradation levels of corresponding CMYK components. In addition, after gradation correction of the CMYK data representing each pixel, halftoning such as error diffusion, a dither method and a screen method is further executed, thereby generating 8-bit halftone CMYK data for example per pixel for each color. Using this halftone CMYK data, a video signal is generated which is for pulse width modulation of an exposure laser pulse for the respective color images in the CMYK colors which are in the engine EG. The video signal is outputted to the engine controller 12 through the engine interface 115. The main controller 11 transmits a command, data or the like to the engine controller 112 based on the program described above, to thereby switch between a print mode and a rewrite mode which will be described later. The main controller 11 also execute processing such as data transmission and stand-by in accordance with a status received from the engine controller 12 in the rewrite mode.

Meanwhile, the engine controller 12 comprises a main interface 121, a CPU 122, a flash memory 123 and a RAM 124 as shown in FIG. 2. The main interface 121 is for communicating with the main controller 11. The engine controller 12 receives a command, data or the like transmitted from the main controller 11 through the main interface 121, and sends a states, such as "data request" and "instruction stand-by request" which will be described later, and the like to the main controller 11.

Further, in this embodiment, the flash memory 123 is used as a "rewritable memory which stores firmware" and the memory area of this memory is partially write-protected. An initial program loader (IPL) is stored in the write-protect area, and firmware is stored in the remaining memory area. Of course, a ROM for storing the initial program loader may be separately disposed and the firmware alone may be stored in the flash memory 123.

Executing the firmware, the CPU 122 controls the respective portions of the engine EG, whereby an image corresponding to the image signal is formed on sheet S such as a copy paper, a transfer paper, other general paper and a transparent sheet for an overhead projector (print mode). In the print mode for forming an image corresponding to an image signal received from the main controller 11 based on the firmware which is stored in the flash memory 123, the main controller 11 functions as a master and the engine controller 12 functions as a slave.

The engine controller 12 is also capable of executing the rewrite mode which is for rewriting the firmware, in addition to the print mode described above. More specifically, a download program is loaded in the RAM 124 based on the initial program loader and the CPU 122 executes the download program, thereby rewriting the firmware. In this embodiment, during the rewrite mode in particular, the engine controller 12 functions as a master while the main controller 11 functions as a slave.

Figure 3:
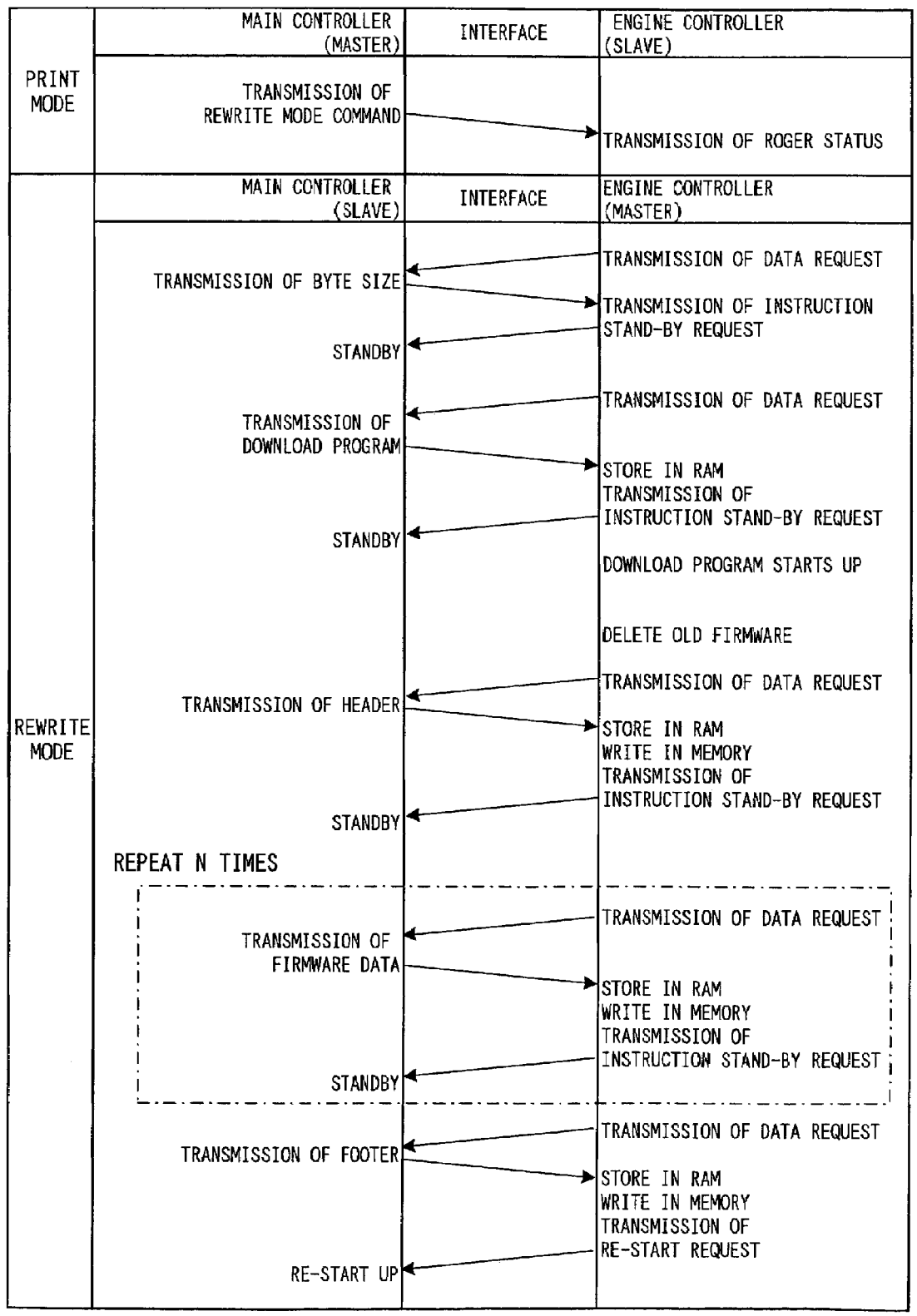
FIG. 3 is a drawing which shows a procedure of a communication between a main controller and an engine controller.
Figure 4:
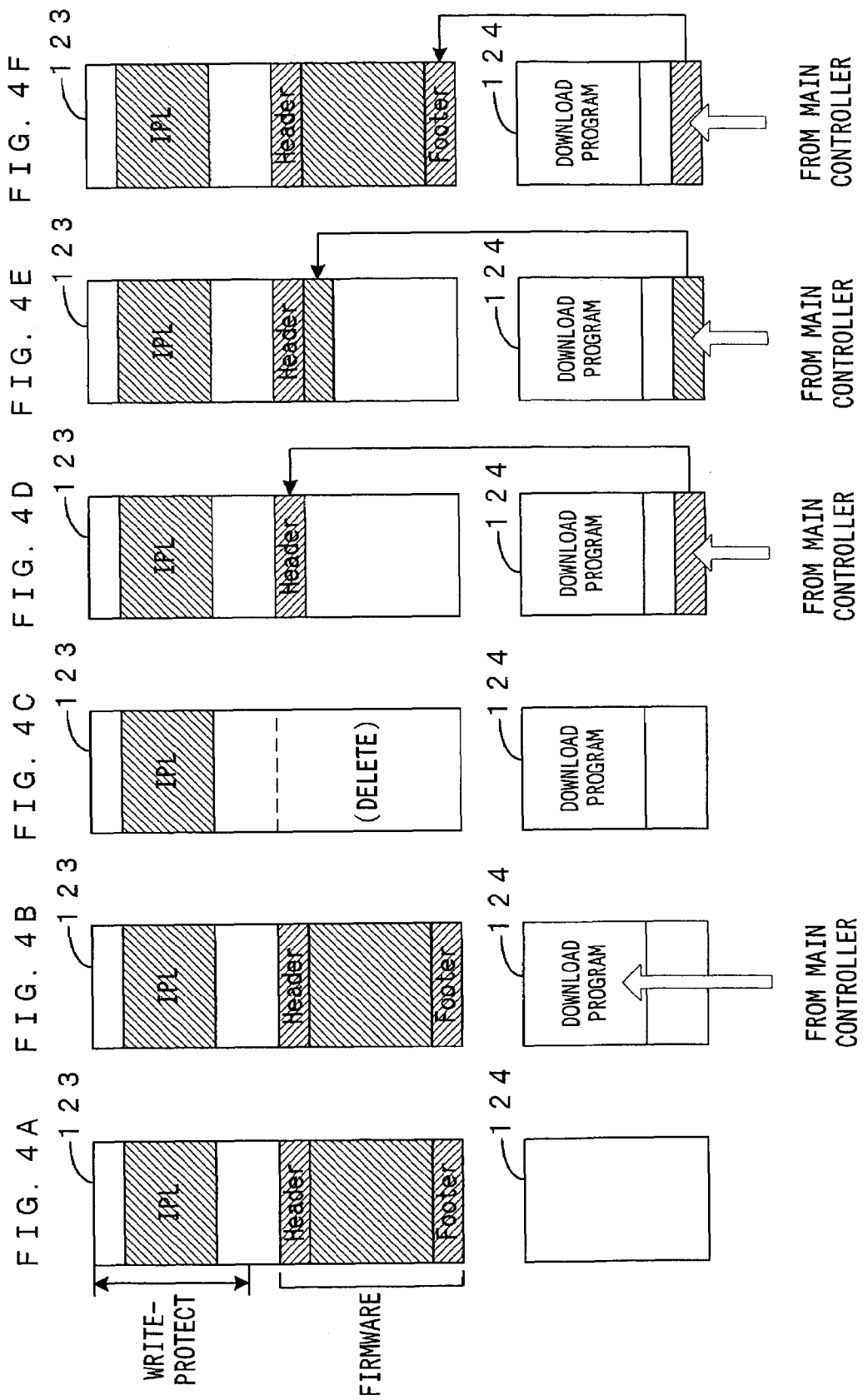
FIGS. 4A through 4F are schematic diagrams which show a state within an engine controller during transfer of data.

Rewriting of the firmware will now be described with reference to FIGS. 3 and 4A through 4F. FIG. 3 is a drawing which shows a procedure of a communication between the main controller and the engine controller, and FIGS. 4A through 4F are schematic diagrams which show a state within the engine controller during transfer of data. In the image forming apparatus which has such a structure described above, the main controller 11 sends a command, data and the like to the engine controller 12. The engine controller 12 receiving these and operating as a slave controls the respective portions of the engine EG based on the firmware which is stored in the flash memory 123, whereby printing is performed (print mode). The state within the memory at this stage is as shown in FIG. 4A.

When it becomes necessary to rewrite the firmware, the main controller 11 is provided with an instruction directed to the image forming apparatus to switch from the print mode to the rewrite mode and also with the download program and new firmware. Describing the specific procedure, a user or service engineer for instance operates a switch group 131 disposed to the operation panel 13, thus instructing the CPU 112 of the main controller 11 to switch to the rewrite mode. In addition, the user or service engineer sets an external recording medium 101, such as a CD-ROM and a floppy™ disk in which the download program and the new firmware are recorded, to the host computer 100. In the event that there are a plurality of host computers 100 connected with the image forming apparatus through a LAN (Local Area Network), any desired host computer 100 may be used. Further, instead of using an external recording medium, a download program and new firmware stored in a predetermined server may be downloaded via a LAN in advance to the hard disk (not shown) of the host computer 100.

Next, the download program and the new firmware are copied to the RAM 114 of the main controller 11 from the host computer 100. At this stage, the copying may be executed using a printer driver installed in the host computer 100. In short, the alternative structure is that when the printer driver is started up, the display of the host computer 100 shows a button for selecting writing of the firmware. As a user, service engineer or the like selects this button, a procedure of necessary processing to write the firmware appears on the display. Operations in accordance with the procedure of processing, the download program and the new firmware stored in the recording medium (CD-ROM, floppy™ disk, hard disk, etc.) are copied automatically to the RAM 114 of the main controller 11. This makes the apparatus user-friendly.

As the copying to the RAM 114 completes in this manner, as shown in FIG. 3, the main controller 11 sends a "rewrite mode" command to the engine controller 12. Upon receipt of the command, the engine controller 12 sends a "roger" status to the main controller 11. This switches the mode from the print mode to the rewrite mode.

In the rewrite mode, while the engine controller 12 serves as a master and the main controller 11 serves as a slave, a communication as described below is carried out and the firmware is rewritten.

(1) Writing of the Download Program 102 (Program Reading Step)

The CPU 122 operates in accordance with the IPL, so that the download program 102 stored in the RAM 114 of the main controller 11 is written in the RAM 124 of the engine controller 12. To be more specific, the engine controller 12 sends a "data request" status to the main controller 11. The main controller 11, receiving the "data request" status, returns a byte size which is indicative of a program length status of the download program 102 to the engine controller 12. The engine controller 12 then sends an "instruction stand-by request" status to the main controller 11, which makes the main controller 11 kept on standby.

Following this, for the purpose of requesting transmission of the download program 102, the engine controller 12 sends a "data request" status to the main controller 11. The main controller 11, receiving the "data request" status, sends the download program 102 to the engine controller 12. In response, the engine controller 12 stores thus sent download program 102 in the RAM 124 (FIG. 4B). The engine controller 12 sends an "instruction stand-by request" status to the main controller 11, which makes the main controller 11 kept on standby.

(2) Writing of the Firmware 103

The download program thereafter is started up in order to write the firmware 103. First, as shown in FIG. 4C, the old firmware stored in the flash memory 123 is deleted (deleting step). To request for transmission of a header of the new firmware 103, the engine controller 12 sends a "data request" status to the main controller 11. The main controller 11, receiving the "data request" status, sends the header of the new firmware 103 to the engine controller 12. The header thus read by the engine controller 12 is temporarily stored in the RAM 124 as shown in FIG. 4D, and then written in the flash memory 123 (writing step: writing procedure). The engine controller 12 sends an "instruction stand-by request" status to the main controller 11, which makes the main controller 11 kept on standby.

To request for transmission of the firmware, the engine controller 12 sends a "data request" status to the main controller 11. The main controller 11, receiving the "data request" status, sends the data of the new firmware 103 in unit length, e.g., in the units of 128 bytes, to the engine controller 12. The firmware thus read by the engine controller 12 is temporarily stored in the RAM 124 as shown in FIG. 4E, and then written in the flash memory 123 (writing step: writing procedure). The engine controller 12 sends an "instruction stand-by request" status to the main controller 11, which makes the main controller 11 kept on standby. Writing of the data in unit length (processing enclosed by the dotted-and-dashed line in FIG. 3) is repeated N times, whereby the firmware as a whole is written in the flash memory 123.

Following this, to request for transmission of a footer of the new firmware 103, the engine controller 12 sends a "data request" status to the main controller 11. The main controller 11, receiving the "data request" status, sends the footer of the new firmware 103 to the engine controller 12. The footer thus read by the engine controller 12 is temporarily stored in the RAM 124 as shown in FIG. 4F, and then written in the flash memory 123 (writing step: writing procedure). As the rewriting of the firmware completes in this manner, the engine controller 12 sends a "re-start request" status to the main controller 11. Upon receipt of the status, the main controller 11 executes re-start processing and the apparatus as a whole re-starts up. As a result, thus rewritten firmware becomes effective.

It is preferable that for every data transfer from the main controller 11 to the engine controller 12, the main controller 11 sends a check sum to the engine controller 12 and whether the data transfer was desirable one is confirmed based on the check sum. In the event of an error during the rewriting processing described above, the engine controller 12 sends an "interrupt request" status to the main controller 11 and predetermined error processing is carried out. The error includes a data transfer error, a delete error in the flash memory 123, a write error and the like.

As described above, according to this embodiment, when rewriting of firmware becomes necessary, the mode switches from the print mode to the rewrite mode and the master/slave relationship between the main controller 11 and the engine controller 12 is reversed. Hence, it is possible to implement the rewrite mode in an appropriate master/slave condition. In other words, in the rewrite mode, the engine controller 12 becomes a master and sends a status to the main controller 11 in accordance with the progress of the rewriting processing. Therefore, it is possible to provide the main controller 11 with a proper instruction at proper timing suitable to each stage of the rewriting processing. This permits to efficiently rewrite the firmware.

Although the download program 102 is read through the main controller 11 in the embodiment described above, the download program 102 may be stored in the write-protect area within the flash memory 123 of the engine controller 12 or in a non-volatile memory such as a ROM in advance.

Further, although the first embodiment described above requires that the switch group 131 of the operation panel 13 is operated so as to instruct switching to the rewrite mode, switching of the mode may be instructed by the host computer 100. For instance, switching of the mode may be instructed from the printer driver which has been started up by the host computer 100.

In addition, although the first embodiment relates to an application of the present invention to an image forming apparatus which formes an image based on an image signal supplied from the host computer 100, i.e., a printer, the present invention is not limited to this application. The present invention is generally applicable to any image forming apparatus, such as a copier machine and a facsimile machine, which forms an image using two controllers which are connected for mutual communications with each other.

B. Second Embodiment

Figure 5:
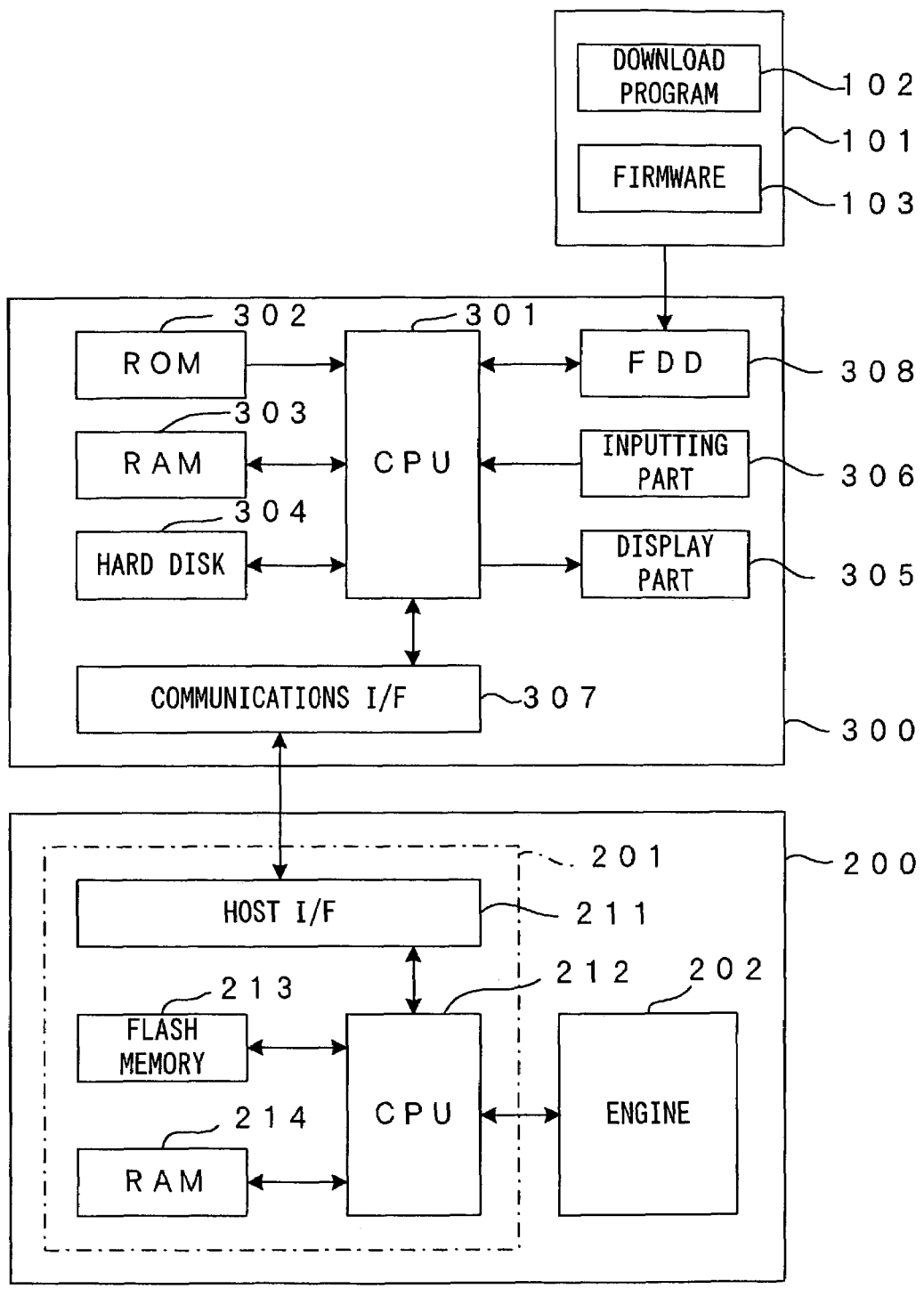
FIG. 5 is a drawing which shows a second embodiment of the present invention.

FIG. 5 is a drawing which shows a second embodiment of the present invention. In this information processing system, as shown in FIG. 5, a host computer 300 and a printer 200 are connected for mutual communications with each other.

The host computer 300 corresponds to a "host apparatus" of the present invention. The host computer 300 sends various types of commands, bitmapped image data and the like to the printer 200, so that the printer 200 is controlled and prints a desired image. More particularly, the host computer 300 comprises: a CPU 301 which serves as a central processor; a ROM 302 in which a starter program for the host computer 300 and the like are stored; a RAM 303 in which a calculation result, data and the like are stored; and a hard disk 304 which stores a program, various types of data and the like which make the host computer 300 carry out a printer driver function, a print monitor function, etc.

The program inside the hard disk 304 is then transferred to the RAM 303 and started up, so that the CPU 301 operates as a printer driver function part and a printer monitor function part. To be more specific, the printer driver function part is for setting/displaying the status of the printer 200, generating bitmapped image data (bit image), generating print data fed to the print monitor function part, etc. Further, the print driver function part makes a display 305 of the host computer 300 show a graphic user interface screen which is for setting/displaying a status, and operates in response to a user instruction from an inputting device 306 such as a mouse and a keyboard.

Meanwhile, the print monitor function part is for generating a command which complies with a protocol with the printer 200 in accordance with print data generated by the print driver function part. The print monitor function part is for receiving a command, a reply and the like from and sending a command, a reply and the like to the printer 200 (including receipt and transmission of a status with the printer 200). The print monitor function part is also for showing an error/warning message, etc. A communications interface 307 is disposed to the host computer 300 in order to handle a command, data and the like with the printer 200 in this manner. The print monitor function part makes the display 305 show a graphic user interface screen which shows an error/warning message, and operates in response to a user instruction from the inputting device 306 such as a mouse and a keyboard.

Further disposed to the host computer 300 is a floppy™ disk drive (FDD) 308, which allows to read out a download program, new firmware and the like from a floppy™ disk drive 101 as described later.

Meanwhile, the printer 200 corresponds to an "image forming apparatus" according to the present invention. The printer 200 is an apparatus which comprises only a minimum mechanism needed as a printer, and is generally called a dumb printer or a host-based printer. As shown in FIG. 5, the printer 200 is an apparatus in which a controller 201 controls an engine 202 in accordance with a command, data or the like sent from the host computer 300 so as to print a desired image.

The controller 201 comprises a host interface 211, a CUP 212, a flash memory 213 and a RAM 214. The host interface 211 is for communicating with the host computer 300. The controller 201 receives a command, data and the like sent from the host computer 300 via the host interface 211, and sends a status such as a "data request" status and an "instruction stand-by request" status, or the like to the host computer 300.

Further, this embodiment uses the flash memory 213 as a "rewritable memory which stores firmware," and a part of the flash memory 213 is write-protected. An initial program loader (IPL) is stored in this write-protect area, and firmware is stored in the remaining memory area. Of course, a ROM for storing the initial program loader may be separately disposed and the firmware alone may be stored in the flash memory 213.

The CPU 212 then controls the respective portions of the engine 202 through execution of firmware, whereby an image is formed on a sheet such as a copy paper, a transfer paper, other general paper and a transparent sheet for an overhead projector (print mode). As described above, in the print mode for printing an image which corresponds to image data received from the host computer 300 based on firmware which is stored in the flash memory 213, the host computer 300 functions as a master and the printer 200 functions as a slave.

In addition to the print mode described above, the printer 200 can execute a rewrite mode, too, which is for rewriting firmware. That is, a download program 102 (See FIG. 5.) is loaded in the RAM 214 based on the initial program loader and the CPU 212 executes the download program 102, thereby rewriting the firmware. In this embodiment, particularly while the rewrite mode presides, the printer 200 functions as a master while the host computer 300 functions as a slave.

Figure 6:
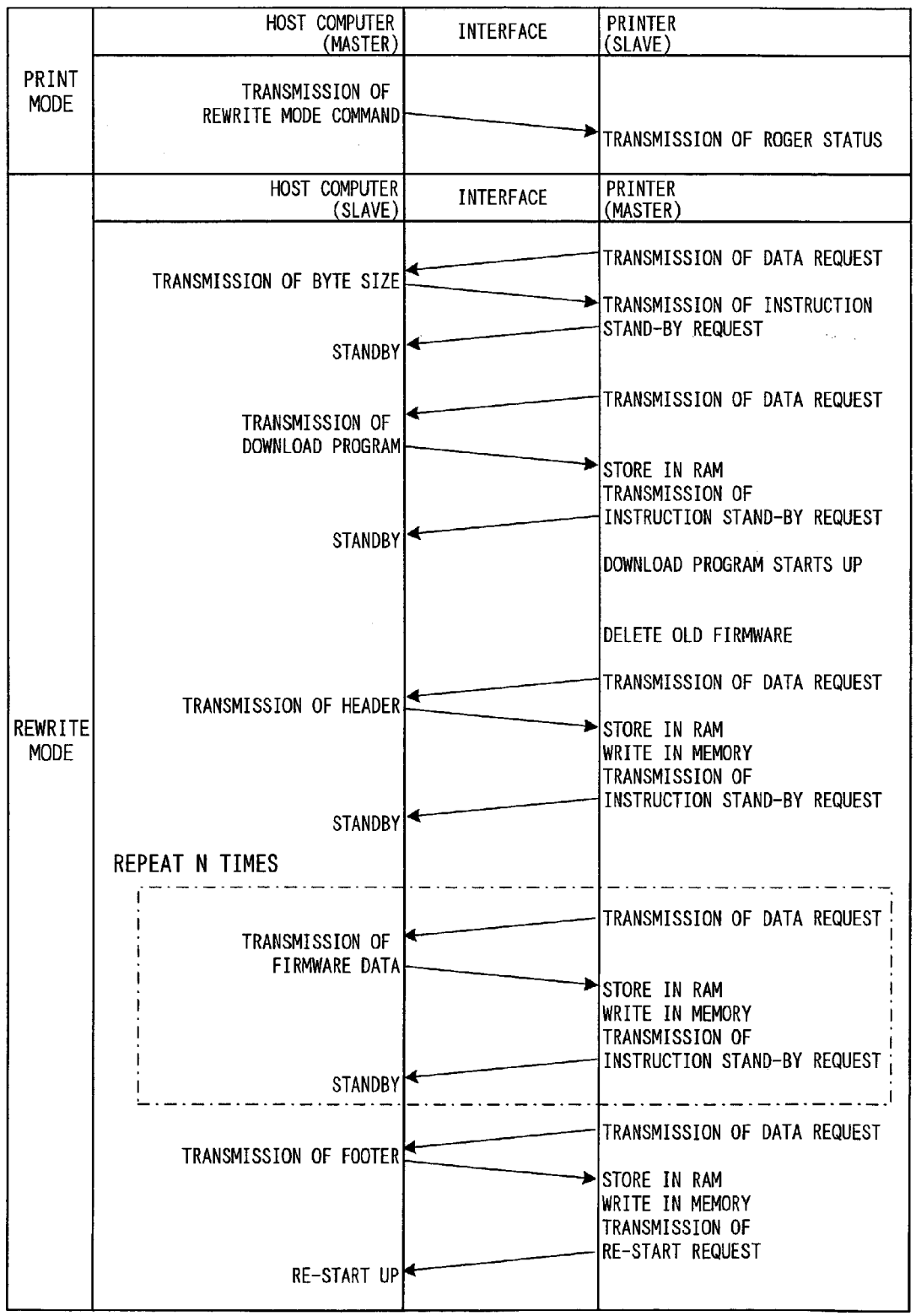
FIG. 6 is a drawing which shows a procedure of a communication between a host computer and a printer.
Figure 7:
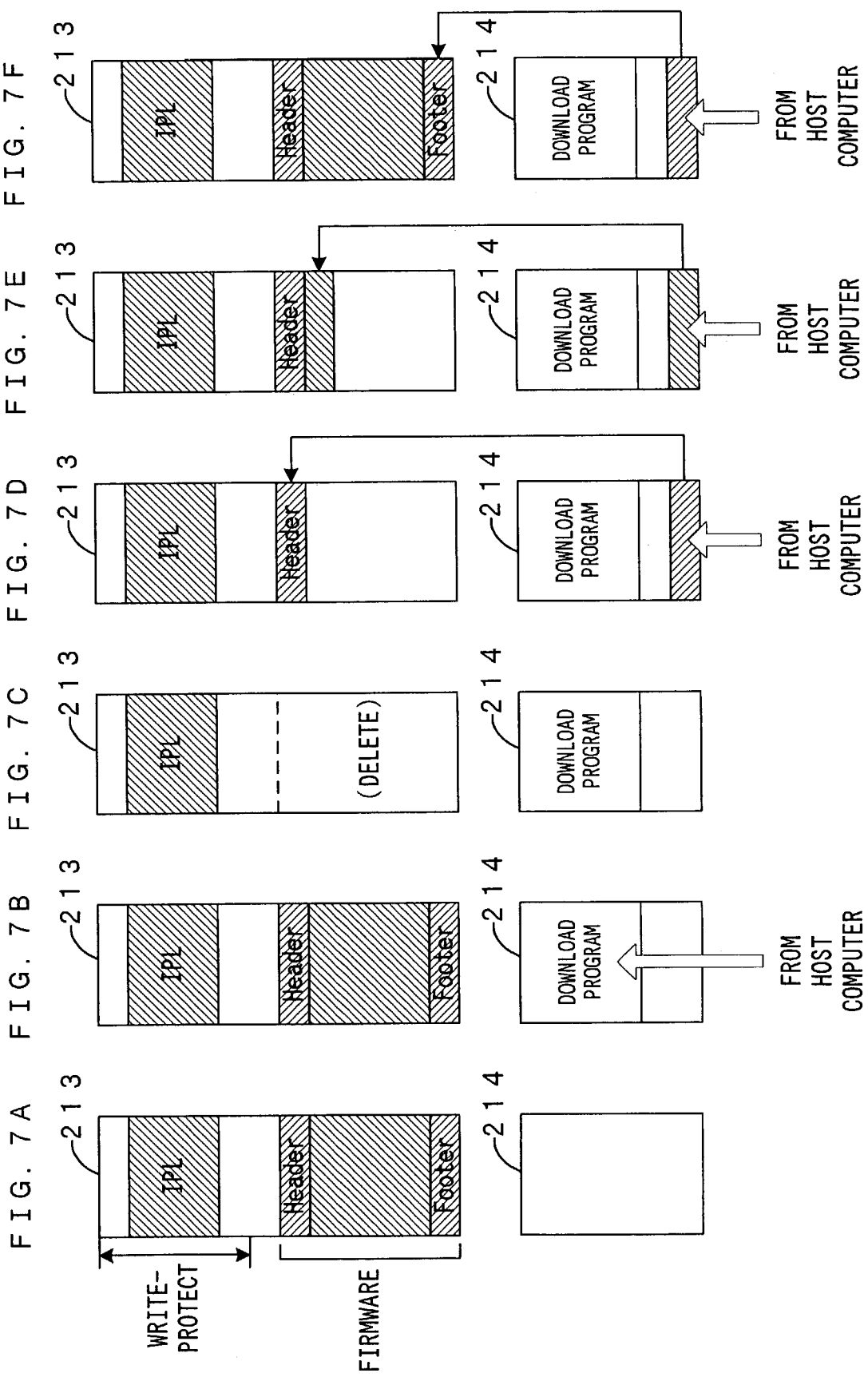
FIGS. 7A through 7F are schematic diagrams which show a state within a printer during transfer of data.

Rewriting of firmware will now be described with reference to FIGS. 6 and 7A through 7F. FIG. 6 is a drawing which shows a procedure of a communication between the host computer (host apparatus) and the printer (image forming apparatus), and FIGS. 7A through 7F are schematic diagrams which show a state within the printer during transfer of data. In the information processing system having such a structure described above, the host computer 300 sends a command, data or the like to the printer 200. The printer 200 receiving this and working as a slave controls the respective portions of the engine 202 based on firmware which is stored in the flash memory 213, and printing is executed (print mode). FIG. 7A shows the state within the memory at this stage.

When rewriting of firmware becomes necessary, the host computer 300 is provided with an instruction which demands to switch from the print mode to the rewrite mode. Meanwhile, the download program 102 (FIG. 5) and the new firmware 103 (FIG. 5) are copied to the host computer 300. As a specific procedure, a user, service engineer or the like sets the floppy™ disk drive 101, in which the download program 102 and the new firmware 103 are recorded, to the floppy™ disk drive 308 of the host computer 300. Further, operating the keyboard and/or the mouse of the inputting device 306, the user, service engineer or the like instructs the CPU 301 of the host computer 300 to switch to the rewrite mode. Although the floppy™ disk drive 101 is used as an external recording medium in this example, other recording medium such as a CD-ROM and an MO may be used instead. Alternatively, a download program and new firmware stored in a predetermined server may be downloaded via a LAN in advance to the hard disk 304 of the host computer 300.

Receiving the instruction for switching of the mode from the user or the like as described above, the host computer 300 sends a "rewrite mode" command to the printer 200. The printer 200 receiving this command sends a "roger" status. As a result, the mode switches from the print mode to the rewrite mode.

In the rewrite mode, as shown in FIG. 6, the printer 200 functions as a master while the host computer 300 functions as a slave. This is followed by a communication as that described below, and the firmware is rewritten.

(1) Writing of the Download Program 102 (Program Reading Step)

The CPU 212 operates in accordance with the IPL, so that the download program 102 stored in the floppy™ disk drive 101 is written in the RAM 214 of the printer 200. To be more specific, the printer 200 sends a "data request" status to the host computer 300. The host computer 300, receiving the "data request" status, returns a byte size which is indicative of a program length status of the download program 102 to the printer 200. The printer 200 then sends an "instruction stand-by request" status to the host computer 300, which makes the host computer 300 kept on standby.

To request for transmission of the download program 102, the printer 200 sends a "data request" status to the host computer 300. The host computer 300, receiving the "data request" status, sends the download program 102 to the printer 200. In response, the printer 200 stores thus sent download program 102 in the RAM 214 (FIG. 7B). The printer 200 sends an "instruction stand-by request" status to the host computer 300, which makes host computer 300 kept on standby.

(2) Writing of the Firmware 103

The download program is thereafter started up in order to write the firmware 103. First, as shown in FIG. 7C, the old firmware stored in the flash memory 213 is deleted (deleting step). To request for transmission of a header of the new firmware 103, the printer 200 sends a "data request" status to the host computer 300. The host computer 300, receiving the "data request" status, sends the header of the new firmware 103 to the printer 200. The header thus read by the printer 200 is temporarily stored in the RAM 214 as shown in FIG. 7D, and then written in the flash memory 213 (writing step: writing procedure). The printer 200 sends an "instruction stand-by request" status to the host computer 300, which makes the host computer 300 kept on standby.

To request for transmission of the firmware, the printer 200 sends a "data request" status to the host computer 300. The host computer 300, receiving the "data request" status, sends the data of the new firmware 103 in unit length, e.g., in the units of 128 bytes, to the printer 200. The firmware thus read by the printer 200 is temporarily stored in the RAM 214 as shown in FIG. 7E, and then written in the flash memory 213 (writing step: writing procedure). The printer 200 sends an "instruction stand-by request" status to the host computer 300, which makes the host computer 300 kept on standby. Writing of the data in unit length (processing enclosed by the dotted-and-dashed line in FIG. 6) is repeated N times, whereby the firmware as a whole is written in the flash memory 213.

Following this, to request for transmission of a footer of the new firmware 103, the printer 200 sends a "data request" status to the host computer 300. The host computer 300, receiving the "data request" status, sends the footer of the new firmware 103 to the printer 200. The footer thus read by the printer 200 is temporarily stored in the RAM 214 as shown in FIG. 7F, and then written in the flash memory 213 (writing step: writing procedure). As the rewriting of the firmware completes in this manner, the printer 200 sends a "re-start request" status to the host computer 300. Upon receipt of the status, the host computer 300 executes re-start processing and the apparatus as a whole re-starts up. As a result, thus rewritten firmware becomes effective.

It is preferable that for every data transfer from the host computer 300 to the printer 200, the host computer 300 sends a check sum to the printer 200 and whether the data transfer was desirable one is confirmed based on the check sum. In the event of an error (such as a data transfer error, a delete error in the flash memory 213, and a write error) during the rewriting processing described above, the printer 200 sends an "interrupt request" status to the host computer 300 and predetermined error processing is carried out.

As described above, according to this embodiment, when rewriting of firmware becomes necessary, the mode switches from the print mode to the rewrite mode and the master/slave relationship between the host computer 300 and the printer 200 is reversed. Hence, it is possible to implement the rewrite mode in an appropriate master/slave condition. In other words, in the rewrite mode, the printer 200 becomes a master and sends a status to the host computer 300 in accordance with the progress of the rewriting processing. Therefore, it is possible to provide the host computer 300 with a proper instruction at proper timing suitable to each stage of the rewriting processing. This permits to efficiently rewrite the firmware.

Although the download program 102 is read via the host computer 300 in the second embodiment described above, the download program 102 may be stored in the write-protect area within the flash memory 213 of the printer 200 or in a non-volatile memory such as a ROM in advance.

Further, although the present invention is applied to an information processing system comprising an apparatus which is generally called a dumb printer or a host-based printer as the image forming apparatus, the image forming apparatus is not limited to this. In short, the present invention is generally applicable to an information processing system which is configured such that a host apparatus and an image forming apparatus are connected for mutual communications with each other and the image forming apparatus formes an image corresponding to a signal received from a host apparatus based on this signal.

C. Third Embodiment

By the way, while the first embodiment described above aims at improving the efficiency of rewriting of firmware by means of switching of the master and the slave. On the other hand, a third embodiment improves the efficiency through restriction of the types of commands which can be used in the rewrite mode. An image forming apparatus according to the third embodiment will now be described with a main emphasis on differences of the third embodiment from the first embodiment. The same structures will be denoted at the same reference symbols as those used in the first embodiment and will not be described again.

The ROM 113 stores a program for the main controller 11 in advance. As the CPU 112 and a logic circuit (not shown) operate in accordance with the program, the received image signal is processed through various types of image processing. That is, receiving the image signal from the host computer 100, the main controller 11 converts RGB data which express gradation levels of RGB components of the respective pixels within the image which corresponds to this image signal into CMYK data which express gradation levels of corresponding CMYK components. In addition, after gradation correction of the CMYK data representing each pixel, halftoning such as error diffusion, a dither method and a screen method is further executed, thereby generating 8-bit halftone CMYK data for example per pixel for each color. Using this halftone CMYK data, a video signal is generated which is for pulse width modulation of an exposure laser pulse for the respective color images in the CMYK colors which are in the engine EG. The video signal is outputted to the engine controller 12 through the engine interface 115. Various types of commands, data or the like are further transmitted to the engine controller 12 based on the program described above, to thereby switch between a print mode and a rewrite mode which will be described later. In the rewrite mode, limited commands, data or the like are then sent to the engine controller 12 and firmware is accordingly rewritten. The specific types of commands will be described later in detail.

Meanwhile, the engine controller 12 comprises a main interface 121, a CPU 122, a flash memory 123 and a RAM 124 as shown in FIG. 2. The main interface 121 is for communicating with the main controller 11. The engine controller 12 is capable of receiving a command, data and the like transmitted from the main controller 11 through the main interface 121, and returning the main controller 11 a status, such as a "basic status," a "paper jam status" and a "DL status" which will be described later in accordance with the received command or the like.

Further, in this embodiment, the flash memory 123 is used as a "rewritable memory which stores firmware" and the memory area of the flash memory 123 is partially write-protected. An initial program loader (IPL) is stored in the write-protect area, and firmware is stored in the remaining memory area. Of course, a ROM for storing the initial program loader may be separately disposed and the firmware alone may be stored in the flash memory 123.

Executing the firmware, the CPU 122 controls the respective portions of the engine EG, whereby an image corresponding to the image signal is formed on a sheet S such as a copy paper, a transfer paper, other general paper and a transparent sheet for an overhead projector (print mode). The engine controller 12 is also capable of executing the rewrite mode which is for rewriting the firmware, in addition to the print mode described above. More specifically, a download program is loaded in the RAM 124 based on the initial program loader and the CPU 122 executes the download program, whereby the firmware is rewritten.

Figure 8:
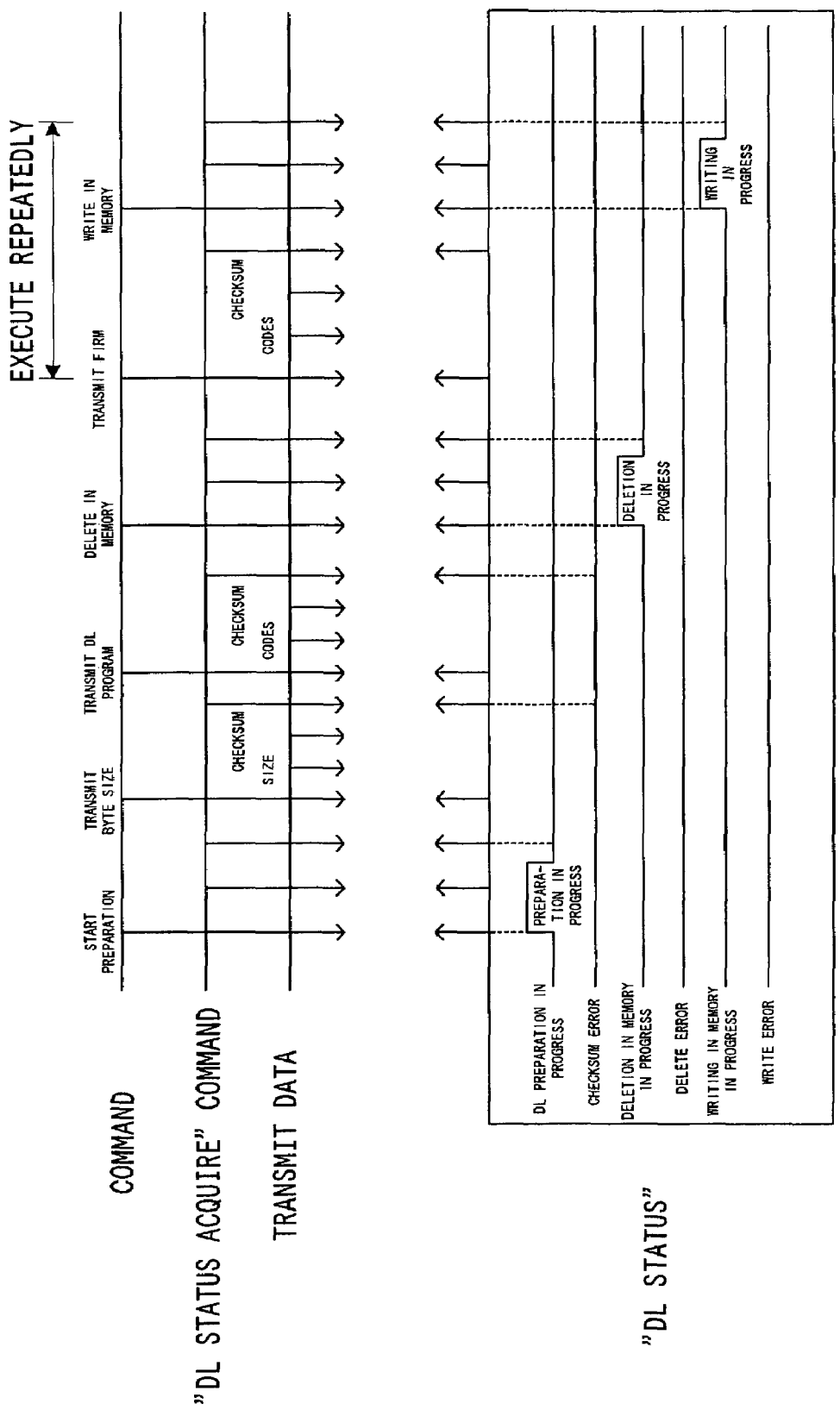
FIG. 8 is a schematic diagram which shows a state within an engine controller during transfer of data.

Rewriting of firmware will now be described with reference to FIGS. 8 and 4A through 4F. FIG. 8 is a drawing which shows a procedure of a communication between the main controller and the engine controller, and FIGS. 4A through 4F are schematic diagrams which show a state within the engine controller during transfer of data.

In the image forming apparatus which has such a structure described above, the main controller 11 sends a command, data and the like to the engine controller 12. The engine controller 12 receiving these and operating as a slave controls the respective portions of the engine EG based on the firmware which is stored in the flash memory 123, whereby printing is performed (print mode). The state within the memory of the engine controller 12 at this stage is as shown in FIG. 4A.

Further, in the print mode, there is no particular restriction upon the types of commands which are fed from the main controller 11 to the engine controller 12. The main controller 11 therefore can appropriately send the engine controller 12 a "print start" command for instructing to start printing, a "test print start" command for instructing to start test printing, a "rewrite mode" command for switching from the print mode to the rewrite mode or the like. Meanwhile, in order to respond to all commands which are sent from the main controller 11, the engine controller 12 is capable of returning the main controller 11 a basic status, a paper jam status or the like. The basic status is indicative of the condition of the engine EG, and the paper jam status is indicative of error information representing a paper jam.

When it becomes necessary to rewrite the firmware, the image forming apparatus is provided with an instruction which demands switching from the print mode to the rewrite mode and the main controller 11 is provided with the download program and new firmware. As a specific procedure, operating a switch group 131 disposed to the operation panel 13, a user or service engineer for instance instructs the CPU 112 of the main controller 11 to switch to the rewrite mode. In addition, the user or service engineer sets an external recording medium 101, such as a CD-ROM and a floppy™ disk in which the download program and the new firmware are recorded, to the host computer 100. In the event that there are a plurality of host computers 100 connected with the image forming apparatus through a LAN (Local Area Network), etc., any desired host computer 100 may be used. Further, instead of using the external recording medium 101, a download program and new firmware stored in a predetermined server may be downloaded via a LAN in advance to the hard disk (not shown) of the host computer 100.

Next, the download program and the new firmware are copied to the RAM 114 of the main controller 11 from the host computer 100. At this stage, the copying operation described above may be executed using a printer driver installed in the host computer 100. In short, the alternative structure is that when the printer driver is started up, a button for selecting writing of the firmware appears on a display. As a user, service engineer or the like selects this button, a procedure of necessary processing to rewrite the firmware appears on the display. Operations in accordance with the procedure make the download program and the new firmware stored in the recording medium (CD-ROM, floppy™ disk, hard disk, etc.) copied automatically to the RAM 114 of the main controller 11. Thus, the apparatus is user-friendly.

As the copying to the RAM 114 completes in this manner, the main controller 11 sends a "write mode" command to the engine controller 12. Upon receipt of the command, the engine controller 12 sends a "roger" status to the main controller 11. This switches the mode from the print mode to the rewrite mode.

In the rewrite mode, only some of the commands prepared in advance in the main controller 11 becomes usable. In other words, in this embodiment, a plurality types of commands are prepared such as a "print start" command and a "test print start" command, while in the rewrite mode, it is possible to use only the following seven commands while use of the other commands is prohibited:

(A) A "DL status acquire" command—The command instructs to acquire a DL status which is indicative of the state of the engine controller;

(B) A "start preparation" command—The command instructs the engine controller to prepare for execution of downloading;

(C) A "delete in memory" command—The command instructs the engine controller to delete in the flash memory;

(D) A "write in memory" command—The command instructs the engine controller to write a code having a predetermined size in the flash memory;

(E) A "byte size send" command—The command instructs to transmit the byte size of a DL program and a checksum;

(F) A "DL program send" command—The command instructs to transmit an object code of a DL program and a checksum; and (G) A "firm send" command—The command instructs to transmit an object code of firmware and a checksum.

Since there is a restriction upon usable commands, statuses returned to the main controller 11 from the engine controller 12 are limited to one type which is "DL status." A "DL status" contains the following six pieces of bit information:

(a) "DL under preparation"—bit information indicative of a state that preparation before execution of rewriting (e.g., to stop the engine part, to prohibit interruption) is ongoing;

(b) "checksum error"—bit information indicative of a state that a checksum does not match;

(c) "deletion in memory in progress"—bit information indicative of a state that the deletion is ongoing in the flash memory 123;

(d) "delete error"—bit information indicative of a failure of deletion in the flash memory 123;

(e) "writing in memory in progress"—bit information indicative of a state that writing in the flash memory 123 is ongoing; and (f) "write error"—bit information indicative of a failure of writing in the flash memory 123.

In the rewrite mode, a communication as that described below is carried out using one status and a command set which is formed by the seven commands, and the firmware is rewritten.

(1) Preparation for Rewriting

First, the main controller 11 sends a "start preparation" command to the engine controller 12. Receiving this command, the engine controller 12 starts up the initial program loader (IPL). The preparation for rewriting the firmware (e.g., to stop the respective portions of the engine EG, to prohibit interruption, etc.) is consequently initiated, and the engine controller 12 returns the main controller 11 a "DL status" which is indicative of a condition that the preparation for rewriting is ongoing. Following this, the main controller 11 sends the engine controller 12 a "DL status acquire" command at predetermined time intervals, and the engine controller 12 returns a "DL status" to the main controller 11 every time the engine controller 12 receives this command. At the same time of or after completion of the preparation for rewriting, receiving a "DL status acquire" command from the main controller 11, the engine controller 12 sends the main controller 11 a "DL status" corresponding to the completing of the rewriting. This "DL status" contains bit information which is indicative of a state that the preparation for rewriting has finished. The main controller 11 thus recognizes that the preparation for rewriting has completed.

(2) Writing of the Download Program 102 (Program Reading Step)

The CPU 122 then operates in accordance with the IPL, so that the download program 102 stored in the RAM 114 of the main controller 11 is written in the RAM 124 of the engine controller 12. To be more specific, the main controller 11 sends the engine controller 12 a "byte size send" command. The engine controller 12, receiving the "byte size send" command, returns a "DL status" to the main controller 11. In response, the main controller 11 sends a byte size, which is indicative of a program length status of the download program 102, and a checksum in this order to the engine controller 12. The main controller 11 then sends a "DL status acquire" command to the engine controller 12. The engine controller 12, responding to this, returns a "DL status" from the main controller 11 and transmission of the download program 102 is started as described below.

The main controller 11 sends a "DL program send" command to the engine controller 12. As the engine controller 12 receiving this sends a "DL status" to the main controller 11, the main controller 11 sends codes of the download program 102. The engine controller 12 stores thus sent download program 102 in the RAM 124 (FIG. 4B). Meanwhile, following the transmission of the codes, the main controller 11 sends a checksum to the engine controller 12. The main controller 11 further sends a "DL status acquire" command to the engine controller 12. In the event that the checksum matches, a "DL status" containing information, which is indicative of that the checksum has matched, is returned to the main controller 11. Noting this, the main controller 11 recognizes that the copying of the download program 102 in the RAM 124 has completed.

When the checksum fails to match at this stage, a "DL status" containing bit information which is indicative of this is returned to the main controller 11 and corresponding predetermined error processing is executed. The error processing in response to the state that the checksum does not match is exactly the same as that during writing of firmware which will be described later.

(3) Deletion of Old the Firmware (Deleting Step)

Next, the main controller 11 sends a "memory delete" command to the engine controller 12. The engine controller 12, receiving this command, starts up the download program. Deletion of the old firmware is then started as shown in FIG. 4C, and the engine controller 12 returns the main controller 11 a "DL status" which is indicative of a state that the deletion is ongoing in the memory. Following this, the main controller 11 sends a "DL status acquire" command to the engine controller 12 at predetermined time intervals, and the engine controller 12 returns a "DL status" to the main controller 11 every time the engine controller 12 receives this command. At the same time of or after completion of the deletion in the memory, as the engine controller 12 receives a "DL status acquire" command from the main controller 11, the engine controller 12 returns the main controller 11 a "DL status". This "DL status" contains bit information which is indicative of a state that the deletion in the memory has finished. The main controller 11 thus recognizes that the deletion of the old firmware has completed.

(4) Writing of Firmware (Writing Step)

Following the deletion of the old firmware, the main controller 11 sends a "firm send" command to the engine controller 12, and the engine controller 12 receiving this command returns a "DL status" to the main controller 11. The main controller 11 then sends codes of new firmware 103 in unit length, e.g., in the units of 128 bytes, to the engine controller 12. The firmware thus read by the engine controller 12 is temporarily stored in the RAM 124, and then written in the flash memory 123 (writing step: writing procedure). The main controller 11 sends a checksum to the engine controller 12, after the transmission of the codes in unit length. When the checksum matches, a "DL status" containing information, which is indicative of that the checksum has matched, is returned from the engine controller 12 to the main controller 11, in response to a "DL status acquire" command from the main controller 11. The main controller 11 thus recognizes that writing of unit-length worth of the firmware 103 in the flash memory 123 has completed. Such writing in unit length is repeated over a plurality of times, whereby the firmware 103 as a whole is written in the flash memory 123. To be specific, writing is repeated through the procedure as that shown in FIGS. 4D through 4E The procedure, mainly, writing of the codes of the firmware 103 will now be described with reference to FIGS. 4D through 4F.

The engine controller 12 sends a header of the new firmware 103 to the main controller 11. Receiving this, the main controller 11 stores the header temporarily in the RAM 124 as shown in FIG. 4D, and then writes the header in the flash memory 123. Following this, the main controller 11 sends the codes of the firmware 103 in unit length, e.g., in the units of 128 bytes, to the engine controller 12. The engine controller 12 stores unit-length worth of the codes temporarily in the RAM 124 as shown in FIG. 4E, and then writes the codes in the flash memory 123. This operation is repeated over a plurality of times. The main controller 11 then sends a footer of the firmware 103 to the engine controller 12. Receiving this, the engine controller 12 stores the footer temporarily in the RAM 124 as shown in FIG. 4F, and then writes the footer in the flash memory 123.

As rewriting of the firmware completes in this manner, the main controller 11 executes re-starting, whereby the apparatus as a whole restarts up and thus rewritten firmware becomes effective.

As described above, according to this embodiment, when the mode switches from the print mode to the rewrite mode, of the plurality of commands which are transmittable from the main controller 11 to the engine controller 12, only those commands needed for rewriting become usable. In short, this is a restriction over transmission of a command irrelevant to rewriting of firmware from the main controller 11 to the engine controller 12 during rewriting. Hence, the engine controller 12 needs return only those DL statuses which correspond to the seven commands which are used in the rewrite mode, thereby improving the efficiency of a communication between the main controller 11 and the engine controller 12 in the rewrite mode. As a result, the efficiency of the rewriting of the firmware improves.

Yet, the present invention is not limited to the embodiment described above but may be modified in various manners to the extent not deviating from the object of the invention. For example, although the embodiment described above requires that the seven commands are prepared as a command set which is effective in the rewrite mode, the types, the number and the like of commands are not limited to those used in the embodiment described above. It is needless to mention that statuses, which are returned from the engine controller 12 to the main controller 11, are not limited to a DL status.

Further, although the switch group 131 of the operation panel 13 is operated so as to instruct switching to the rewrite mode in the embodiment described above, the switching of the mode may be instructed from the host computer 100. For instance, a printer driver started up by the host computer 100 may instruct to switch the mode.

Still further, although the embodiment described above relates to an application of the present invention to an image forming apparatus which formes an image based on an image signal supplied from the host computer 100, i.e., a printer, the present invention is not limited to this application. The present invention is generally applicable to any image forming apparatus, such as a copier machine and a facsimile machine, which formes an image using two controllers which are connected for mutual communications with each other. In addition, the present invention is applicable also to an information processing system in which a host apparatus such as a host computer and an image forming apparatus such as a printer are connected for mutual communications with each other as shown in FIG. 5 for instance. In the case of the application to the information processing system, too, similar effect and function are obtained.

D. Fourth Embodiment

By the way, while the firmware is rewritten in the embodiments described above, it is desirable to implement a countermeasure if the rewriting fails. Noting this, a fourth embodiment requires that the engine controller 12 executes the rewrite mode and judges whether a rewrite error (a communications error, a delete error and a write error) has occurred during execution of the rewrite mode. In the event that a rewrite error has occurred, the respective portions of the apparatus are controlled so that a user, service engineer or the like will be encouraged to re-execute the rewriting of the firmware. In other words, an image forming apparatus according to the fourth embodiment performs: (i) rewriting of firmware; (ii) detection of a rewrite error during rewriting; and (iii) re-execution of the rewrite mode in this order. Since the structure for the execution is the same, the fourth embodiment will now be described in detail with reference to associated drawings, with a main emphasis on operations which are different from those according to the earlier embodiments.

(i) Rewriting of Firmware

This procedure is exactly the same as those according to the earlier embodiments and will not be described.

(ii) Detection of Rewrite Error during Rewriting

Figure 9:
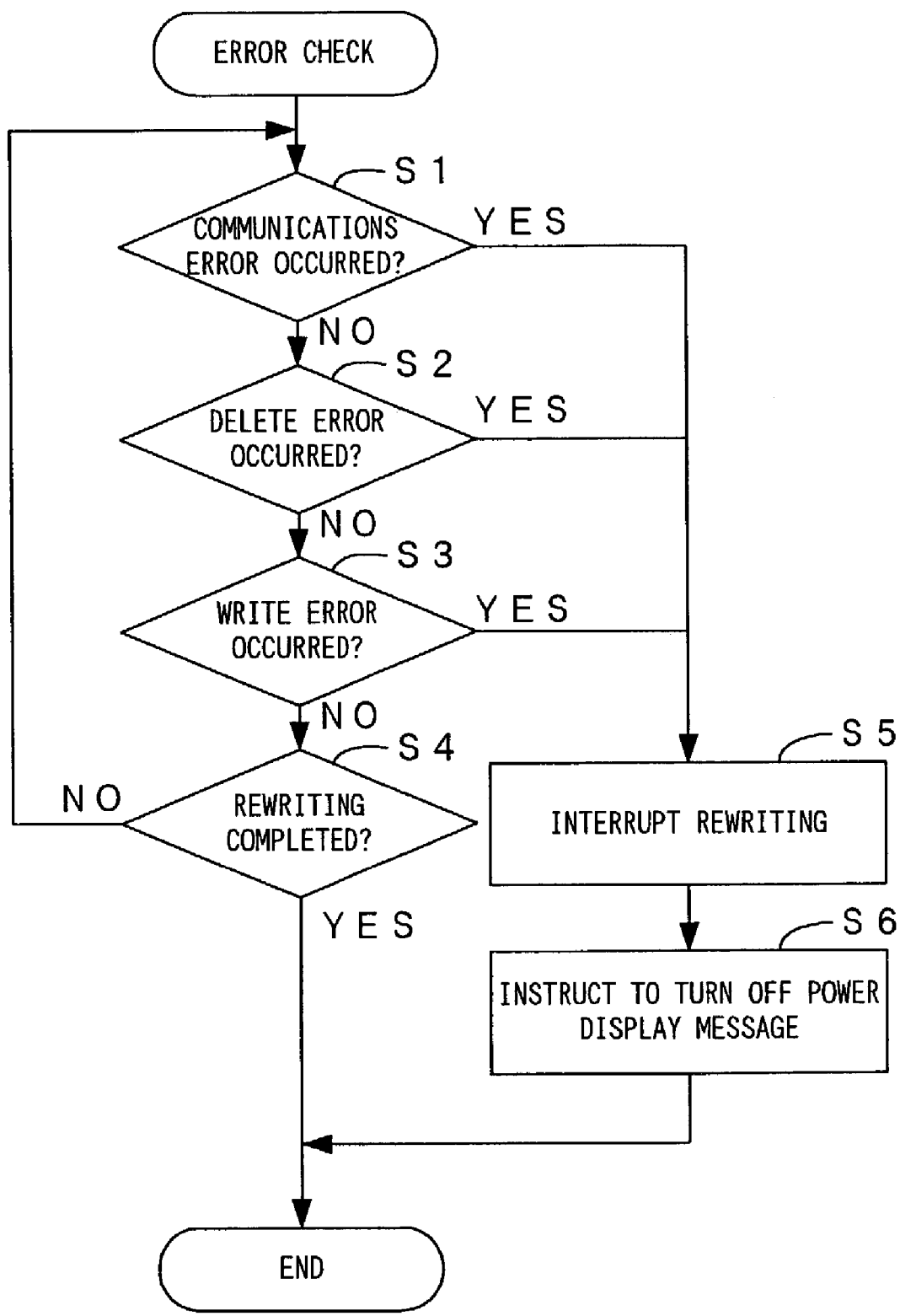
FIG. 9 is a flow chart which shows detection of a rewrite error during execution of rewriting within the image forming apparatus which is shown in FIG. 1.

FIG. 9 is a flow chart which shows detection of a rewrite error during execution of rewriting within the image forming apparatus which is shown in FIG. 1. The image forming apparatus executes steps S1 through S4 during execution of the rewrite mode, and accordingly determines whether a rewrite error has occurred. To be more specific, the main controller 11 sends a checksum to the engine controller 12 for every transfer of data from the main controller 11 to the engine controller 12, and whether the data transfer was desirable one is confirmed based on the check sum (Step S1). Further, whether a delete error has occurred in the flash memory 123 during the rewriting is judged (Step S2). In addition, whether a write error during writing of data in the flash memory 123 has occurred is judged (Step S3).

Even only one error occurring before completion of the rewriting makes the image forming apparatus immediately proceed to a step S5, so that the engine controller 12 sends an "interrupt request" status to the main controller 11 and the rewriting is interrupted. Further, the main controller 11 makes the display 132 shows a message which reads, "Please turn off the power and turn on the power again after a few minutes." At the same time, the main controller 11 sends a similar message to the host computer 100, and the host computer 100 shows the message on the display of the host computer 100 (Step S6). While this message is shown on the both displays of the image forming apparatus and the host computer 100 according to this embodiment, only either one of the displays may show the message.

In this manner, this embodiment prevents continued execution of printing despite the rewrite error. As a result, this embodiment prevents operation failures attributed to firmware, such as a malfunction of the apparatus and printing becoming impossible, without fail. In addition, it is possible to notify the user, service engineer or the like of occurrence of the rewrite error during the rewriting.

(iii) Re-Execution of Rewrite Mode

Figure 10:
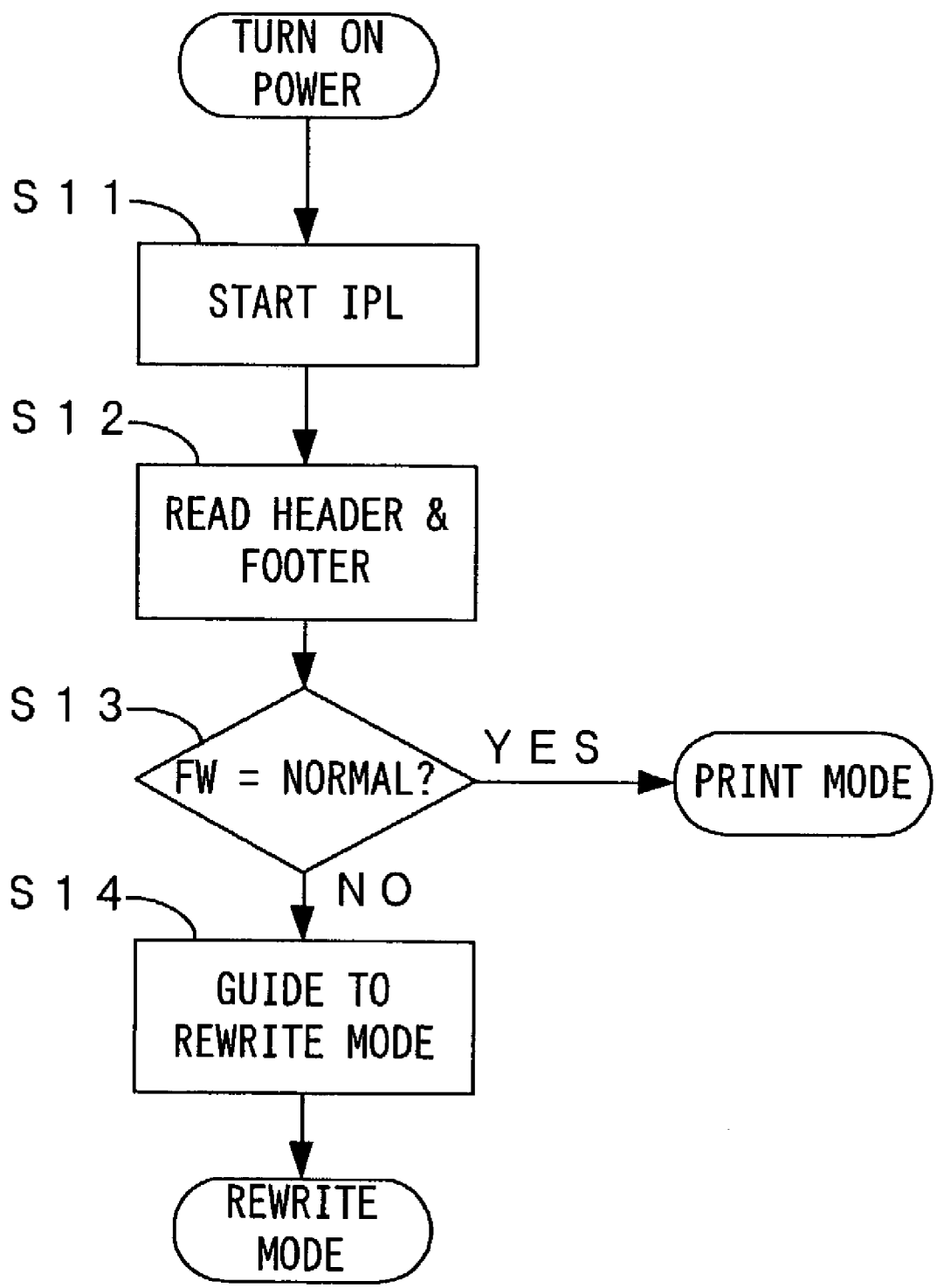
FIG. 10 is a flow chart which shows an initial operation upon turning on of a power source.

Next, as the user, service engineer or the like turns on the power source of the image forming apparatus again in accordance with the message, re-execution of the rewrite mode shown in FIG. 10 is carried out. FIG. 10 is a flow chart which shows an initial operation upon turning on of the power source. According to this embodiment, upon turning on of the power source, an initial program loader starts operating (Step S11). And the CPU 122 executes the initial program, whereby whether a rewrite error has occurred during execution of the rewrite mode is detected (Step S12, Step S13). To be more specific, at the step S12, the contents of the header and the footer of the firmware are read out.

Whether the firmware is normal is then determined based on the contents of the header and the footer (Step S13). For example, when the contents of both the header and the footer have correct values, it is determined that the firmware is normal and the apparatus moves to the print mode. While routine printing with the image forming apparatus is ongoing, that is, when rewriting of the firmware as that described above is not to be executed, "YES" is acknowledged at the step S13. Hence, the image forming apparatus accepts an image signal from an external apparatus such as the host computer 100 and executes printing.

Meanwhile, when at least one of the contents of the header and the footer has an abnormal value, the firmware is abnormal. It is thus learned that a rewrite error has occurred during execution of the rewrite mode. When the contents of both the header and the footer have abnormal values for example, it is highly probable that a delete error has occurred. Further, when the content of the footer has an abnormal value although the content of the header has a normal value for instance, it is highly probable that an error (write error) has occurred at the step of writing which is shown in FIG. 4E. Whichever the situation may be, when it is "NO" at the step S13, the apparatus proceeds to a step S14 at which the apparatus is guided to enter the rewrite mode, and the apparatus re-executes rewriting of the firmware.

Figure 11:
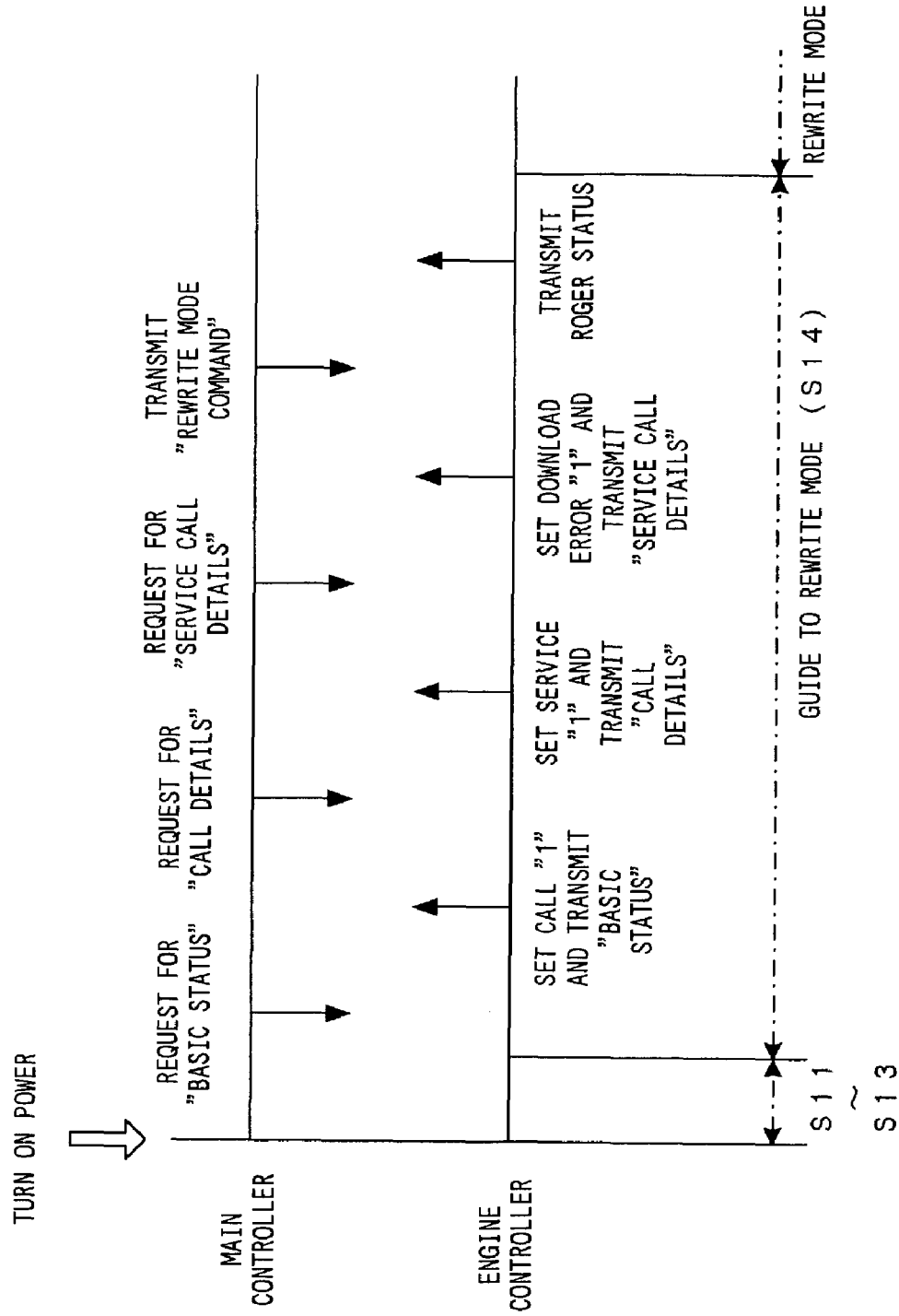
FIG. 11 is a drawing which shows an operation of guiding to a rewrite mode.

FIG. 11 is a drawing which shows an operation of guiding to the rewrite mode. The steps S11 through S13 described above are executed upon turning on off the power source. Further, when it is "NO" at the step S13, a procedure of guiding to the rewrite mode (Step S14) is performed. During the guiding procedure, the main controller 11 demands the engine controller 12 to send a "basic status." The "basic status" herein referred to is formed by 8-bit data as shown in the top-most section in FIG. 12. Contents representing basic states of the image forming apparatus, such as "call" and "pausing," are allocated to the respective bits. Receiving the request, the engine controller 12 sets "1" to the "call bit" contained in the "basic status" and "0" to the other bits and then sends this "basic status" to the main controller 11, for the purpose of executing the guiding procedure.

Figure 12:
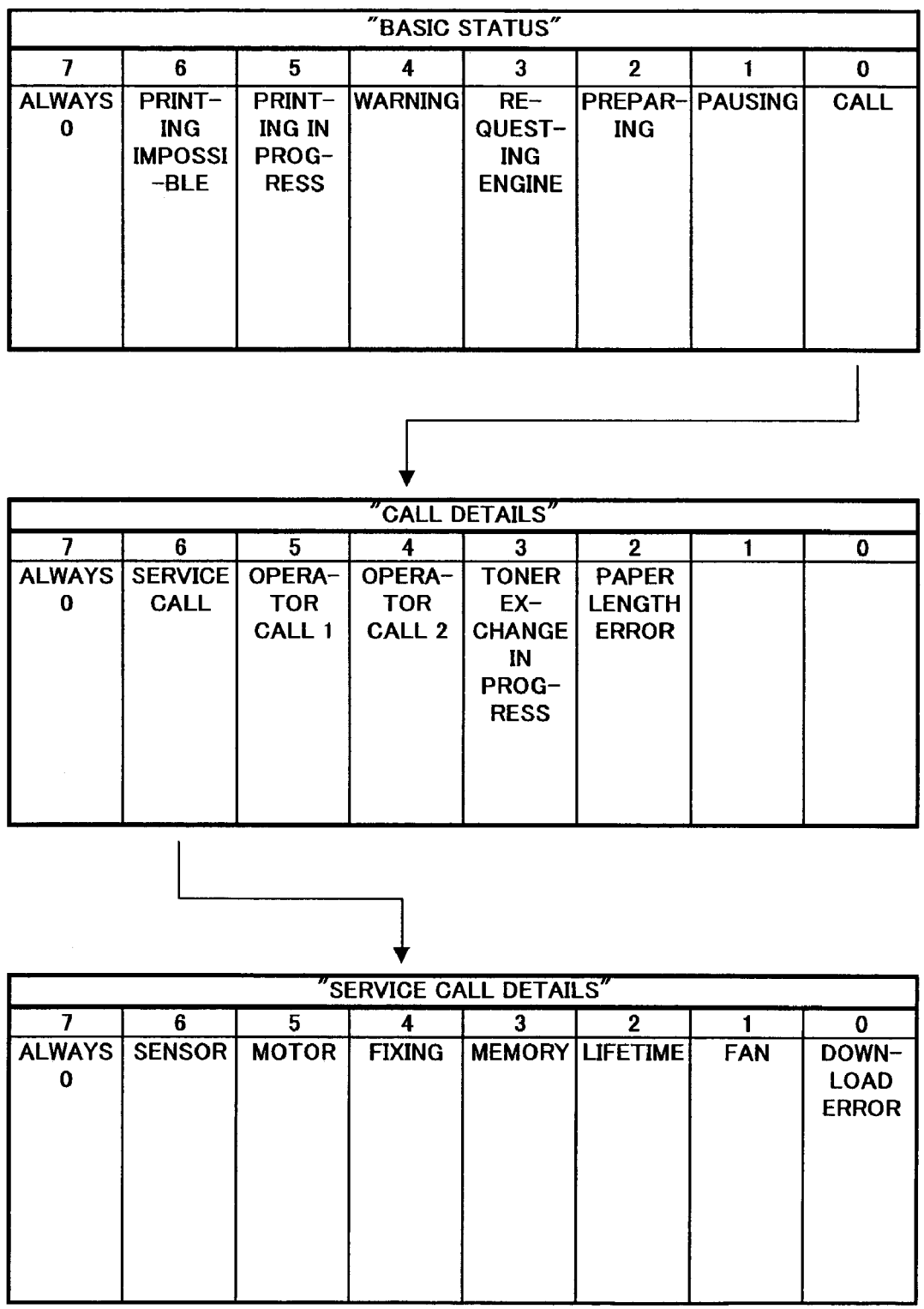
FIG. 12 is a drawing which shows a status structure used in the image forming apparatus which is shown in FIG. 1.

Noting that "1" is set to the "call bit," the main controller 11 demands the engine controller 12 to send "call details." The "call details" are formed by 8-bit data as shown in a middle section in FIG. 12. Contents regarding a call, such as "paper length error" and "service call," are allocated to the respective bits. Receiving the request, the engine controller 12 sets "1" to "service call" contained in the "call details" and "0" to the other bits, and then sends this "call details" to the main controller 11.

Noting that "1" is set to the "service call details," the main controller 11 demands the engine controller 12 to send "service call details." The "service call details" are formed by 8-bit data as shown in the bottom-most section in FIG. 12. Contents regarding a service call, such as "download error" and "fan," are allocated to the respective bits. Receiving the request, the engine controller 12 sets "1" to "download error" contained in the "service call details" and "0" to the other bits, and then sends this "service call details" to the main controller 11.

Further, the main controller 11 sends a "rewrite mode" command to the engine controller 12. The engine controller 12, receiving the command, sends a "roger" status. In consequence, the mode switches from the print mode to the rewrite mode. The apparatus is guided to the rewrite mode in this fashion, and rewriting of the firmware is executed once again in accordance with a similar sequence to that according to the earlier embodiments.

As described above, according to this embodiment, since a header and a footer are contained as "error detect information" of the present invention in firmware and the firmware is rewritten including the header and the footer, it is possible to detect whether a rewrite error has occurred by verifying the contents of the header and the footer. Hence, it is possible to detect abnormality in the firmware without fail. Further, owing to the header and the footer contained as "error detect information" of the present invention, whichever stage during rewriting a rewrite error occurs at, the occurrence of the rewrite error can be detected at the time of re-turning on of the power source.

When a rewrite error is detected, the rewrite mode is executed once again, instead of moving directly to the print mode. It is therefore possible to prevent execution of printing despite the rewrite error. As a result, operation failures attributed to firmware, such as a malfunction of the apparatus and printing becoming impossible, are prevented without fail.

In addition, when a rewrite error is detected, the rewrite mode is executed prior to execution of the print mode. In other words, printing is performed after rewriting of firmware completes. Hence, it is possible to execute printing always in accordance with normal firmware and print in a high quality.

Further, the initial operation is executed based on the program loaded by the initial program loader, and the program makes sure that detection of a rewrite error (Step S12, Step S13) and guiding to the rewrite mode (Step S14) will be executed. This embodiment uses a hierarchical status structure, and the engine controller 12 guides the apparatus to the rewrite mode while shifting from a status having a high priority level as viewed from the main controller 11, namely, a high-priority "basic status" shown in FIG. 12, sequentially to low-priority statuses. In short, since the apparatus is guided to enter the rewrite mode by means of transmission of the following three statuses:

(a) setting of one bit in and transmission of a "basic status";

(b) setting of one bit in and transmission of "call details"; and (c) setting of one bit in and transmission of "service call details,"

as shown in FIG. 12 according to this embodiment, the program is compact. Still further, this reduces a memory size for storing the initial program loader.

Although a header and a footer are contained as "error detect information" of the present invention in firmware according to the embodiment described above, "error detect information" of the present invention is not limited to only this. For example, a rewrite error flag may be set up in a portion of a memory upon occurrence of a communications error, a delete error or a write error. In such a structure, the rewrite error flag functions as "error detect information" of the present invention. Whether a rewrite error has occurred may be detected in accordance with whether the rewrite error flag has been set up. In addition, in a structure that the power source of the apparatus is temporarily turned off upon occurrence of a rewrite error as in the embodiments described above, it is desirable that a rewrite error flag is set up within a non-volatile memory. Alternatively, CRC (Cyclic Redundancy Check), a checksum or the like may be used as "error detect information."

Further, the firmware and the initial program loader are stored in the same flash memory 123 in the embodiments described above. That is, a rewritable memory space within the flash memory 123 functions as a "first memory" of the present invention and the initial program loader (IPL) functions as a "second memory" of the present invention within the write-protect area of the flash memory 123. It is of course needless to mention that the firmware and the initial program loader may be stored in memory elements which are independent of each other.

Further, although the embodiments described above relate to an application of the present invention to an image forming apparatus which formes an image based on an image signal supplied from the host computer 100, i.e., a printer, the present invention is not limited to this application. The present invention is generally applicable to any image forming apparatus, such as a copier machine and a facsimile machine, which formes an image using two controllers which are connected for mutual communications with each other. In addition, the present invention is applicable also to an image forming apparatus 200 shown in FIG. 5 which is generally called a dumb printer or a host-based printer.

E. Others

Although the foregoing has described that the download program 102 is read through the main controller 11, the download program 102 may be stored in the write-protect area of the flash memory 123 of the engine controller 12 or in other non-volatile memory such as a ROM.

Further, although the switch group 131 of the operation panel 13 is operated so as to instruct switching to the rewrite mode in the embodiment described above, the switching of the mode may be instructed from the host computer 100. For instance, a printer driver started up by the host computer 100 may instruct to switch the mode.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
a main controller;
an engine controller which includes a writable first memory which stores firmware; and
a second memory in which an initial program loader is stored;
wherein said main controller and said engine controller are connected for mutual communications with each other and said apparatus as a whole is controlled as a plurality of types of commands are sent from said main controller to said engine controller,
wherein when a rewrite mode for rewriting firmware is selected, the number of the types of usable commands is reduced,
wherein at the time of turning on of a power source of said image forming apparatus, whether a rewrite error has occurred during execution of said rewrite mode is detected based on a program which is loaded by said initial program loader; and
wherein said image forming apparatus is guided to enter said rewrite mode upon detection of said rewrite error.

2. The image forming apparatus of claim 1, wherein said firmware contains at least one or more pieces of error detect information; and said rewrite error is detected based on the content of said error detect information.

3. The image forming apparatus of claim 2, wherein a header and a footer are provided respectively at the beginning and the end of said firmware as said error detect information.

4. A firmware rewriting method for use in an image forming apparatus in which an engine controller, comprising a writable memory which stores firmware, and a main controller are connected for mutual communications with each other and said apparatus as a whole is controlled as a plurality types of commands are sent from said main controller to said engine controller, said method comprising;
setting that only some of said plurality types of commands become usable when a rewrite mode for rewriting firmware is selected;
executing said rewrite mode as said main controller sends those usable commands to said engine controller,
detecting, at the time of turning on of a power source of said image forming apparatus, whether a rewrite error has occurred during execution of said rewrite mode based on a program which is loaded by an initial program loader that is stored in a second memory; and
guiding said image forming apparatus to enter said rewrite mode upon detection of said rewrite error.

5. A recording medium comprising a program for rewriting firmware for an image forming apparatus in which an engine controller, comprising a writable memory which stores said firmware, and a main controller are connected for mutual communications with each other and said apparatus as a whole is controlled as a plurality types of commands are sent from said main controller to said engine controller, said program comprising the operations of:
judging whether a rewrite mode for rewriting firmware is selected;
making only some of said plurality types of commands usable, when said rewrite mode is selected;
sending those usable commands to said engine controller from said main controller and accordingly rewriting firmware,
detecting, at the time of turning on of a power source of said image forming apparatus, whether a rewrite error has occurred during execution of said rewrite mode bases on a program which is loaded by an initial program loader that is stored in a second memory; and
guiding said image forming apparatus to enter said rewrite mode upon detection of said rewrite error.

6. An information processing system comprising:
a host apparatus;
an image forming apparatus including a writable memory which stores firmware; and
a second memory in which an initial program loader is stored,
wherein said host apparatus and said image forming apparatus are connected for mutual communications with each other and said image forming apparatus is controlled as a plurality types of commands are sent from said host apparatus to said image forming apparatus,
wherein when a rewrite mode for rewriting firmware is selected, the number of the types of usable commands is reduced, wherein at the time of turning on of a power source of said image forming apparatus, whether a rewrite error has occurred during execution of said rewrite mode is detected based on a program which is loaded by said initial program loader; and wherein said image forming apparatus is guided to enter said rewrite mode upon detection of said rewrite error.

7. A firmware rewriting method for use in an information processing system in which an image forming apparatus, comprising a writable memory which stores firmware, and a host apparatus are connected for mutual communications with each other and said image forming apparatus is controlled as a plurality types of commands are sent from said host apparatus to said image forming apparatus, said method comprising;

setting that only some of said plurality types of commands become usable when a rewrite mode for rewriting firmware is selected;

executing said rewrite mode as said host apparatus sends those usable commands to said image forming apparatus;

detecting, at the time of turning on of a power source of said image forming apparatus, whether a rewrite error has occurred during execution of said rewrite mode based on a program which is loaded by an initial program loader that is stored in a second memory; and guiding said image forming apparatus to enter said rewrite mode upon detection of said rewrite error.

8. A recording medium comprising a program for rewriting firmware for an information processing system in which an image forming apparatus, comprising a writable memory which stores firmware, and a host apparatus are connected for mutual communications with each other and said image forming apparatus forms an image which corresponds to a signal fed from said host apparatus in accordance with said signal, said program comprising the operations of:

judging whether a rewrite mode for rewriting firmware is selected;

making only some of said plurality types of commands usable, when said rewrite mode is selected; sending those usable commands to said image forming apparatus from said host apparatus and accordingly rewriting firmware;

detecting, at the time of turning on of a power source of said image forming apparatus, whether a rewrite error has occurred during execution of said rewrite mode based on a program which is loaded by an initial program loader that is stored in a second memory; and guiding said image forming apparatus to enter said rewrite mode upon detection of said rewrite error.

* * * * *